United States Patent [19]

Matsumoto et al.

[11] Patent Number: 4,810,607

[45] Date of Patent: Mar. 7, 1989

[54] PHOTOSENSITIVE MEMBER FOR ELECTROPHOTOGRAPHY CONTAINING TRISAZO PIGMENT HAVING PYRIDYLENE GROUP IN ITS CENTRAL SKELETON

[75] Inventors: Masakazu Matsumoto, Yokohama; Takao Takiguchi, Tokyo; Hideyuki Takai, Yokohama, all of Japan

[73] Assignee: Canon Kabushiki Kaisha, Tokyo, Japan

[21] Appl. No.: 73,221

[22] Filed: Jul. 14, 1987

[30] Foreign Application Priority Data

Jul. 22, 1986 [JP] Japan ................................ 61-172580

[51] Int. Cl.[4] ................................................ G03G 5/06

[52] U.S. Cl. ......................................... 430/73; 430/76; 430/78

[58] Field of Search ........................ 430/58, 72, 73, 76, 430/78

[56] References Cited

U.S. PATENT DOCUMENTS 4,612,271 9/1986 Makino et al. ........................ 430/72

4,666,810 5/1987 Umehara et al. ..................... 430/72

*Primary Examiner*—John L. Goodrow

*Attorney, Agent, or Firm*—Fitzpatrick, Cella, Harper & Scinto

[57] ABSTRACT

A photosensitive member for electrophotography comprises a photosensitive layer containing a trisazo pigment represented by the formula:

$$\begin{array}{c} \quad\quad\quad\quad\quad\quad\quad Ar_2-N=N-A \\ \quad\quad\quad\quad\quad | \\ A-N=N-Ar_1-N-Ar_3-N=N-A, \end{array} \quad (1)$$

wherein $Ar_1$ is a pyridylene group capable of having a substituent; $Ar_2$ and $Ar_3$ are respectively a pyridylene group or an arylene group each capable of having a substituent; and A is a coupler residue having a phenolic OH group. Because the trisazo pigment has a characteristic central skeleton including the central nitrogen atom and an adjacent pyridylene group, the photosensitive member has a sensitivity region expanded to the near-infrared region and shows a stable charging characteristic during a continuous electrophotographic operation.

6 Claims, No Drawings

PHOTOSENSITIVE MEMBER FOR ELECTROPHOTOGRAPHY CONTAINING TRISAZO PIGMENT HAVING PYRIDYLENE GROUP IN ITS CENTRAL SKELETON

FIELD OF THE INVENTION AND RELATED ART

The present invention relates to a photosensitive member for electrophotography and particularly to a photosensitive member for electrophotography having a photosensitive layer containing a specific azo pigment.

Hitherto, pigments and dyes showing photoconductivity have been reported in a large number of publications. For example, "RCA Review" Vol. 23, p.p. 413–419 (1962. 9) has reported photoconductivity of phthalocyanine pigments. Further, photosensitive members using such phthalocyanine pigments are disclosed in U.S. Pat. Nos. 3,397,086 and 3,816,118. Examples of other known organic semiconductors include pyrylium dyes as disclosed in U.S. Pat. Nos. 4,315,983 and 3,427,169 and "Research Disclosure" 20517 (1981. 5), squaric acid methine dyes as disclosed in U.S. Pat. No. 3,824,099, and disazo pigments as disclosed in U.S. Pat. Nos. 3,898,084 and 4,251,613.

Organic photoconductors as described above may be more easily synthesized than inorganic photoconductors and are capable of relatively easily changing the sensitive wavelength region with respect to the sensitivity to visible light, so that they can be controlled in color sensitivity. Further, they are non-polluting and much more excellent in productivity and from an economical viewpoint than inorganic semiconductors. For these reasons, in recent years, many companies have competed with each other in early development of organic photoconductors, among which not a few have reached a practical level in respects of sensitivity and durability. There is still considerable room for improvement.

On the other hand, in recent years, there has been increasing demand for organic photoconductors having an expanded sensitive wavelength region up to the near infrared wavelength region of the semiconductor laser beam (at present, 750 nm or longer, or the vicinity of 780–800 nm are particularly preferred practically in view of economical factors, output and adaptability to a photosensitive member. Such members can be used as photosensitive members, for digital recording as by a laser printer. When the conventional organic photoconductors are reviewed from this viewpoint, there have been proposed the above-mentioned phthalocyanine pigment, the aluminum phthalocyanine pigment having improved sensitivity as disclosed in U.S. Pat. No. 4,426,434; triphenylamine-type trisazo pigments disclosed in U.S. Pat. Nos. 4,436,800; 4,439,506; and 4,551,404, N-phenyl-substituted diphenylamine-type disazo pigments disclosed in U.S. Pat. No. 4,582,771, tetrakisazo pigments disclosed in U.S. Pat. No. 4,447,513, etc., as photoconductors adapted for semiconductor laser.

When an organic photoconductor is used as a photosensitive member for semiconductor laser, it is required not only to have an expanded sensitive wavelength region on a longer wavelength side but also to satisfy various properties, such as good sensitivity and durability, a uniform sensitivity for a wide variable wavelength region because the wavelength of a beam issued from a semiconductor laser varies depending on temperature during use, and further a good productivity. The above-mentioned organic photoconductors do not fully satisfy these conditions.

SUMMARY OF THE INVENTION

A primary object of the present invention is to provide a novel photosensitive member for electrophotography.

Another object of the present invention is to provide a photosensitive member for electrophotography having a practically high sensitivity to the visual region, and a stable potential characteristic on repetitive use.

A further object of the present invention is to provide a novel photoconductor for the near infrared region.

A still further object of the present invention is to provide a photosensitive member for electrophotography showing a constant sensitivity in the long wavelength region.

A yet further object of the present invention is to provide a photosensitive member for electrophotography showing a practically high sensitivity and a stable potential characteristic when used in an apparatus, such as a laser copier, a laser beam printer and an LED printer, using a photosensitive member for digital recording.

According to the present invention, there is provided a photosensitive member for electrophotography, which comprises a photosensitive layer containing a trisazo pigment represented by the formula:

$$\begin{array}{c} \mathrm{Ar_2{-}N{=}N{-}A} \\ | \\ \mathrm{A{-}N{=}N{-}Ar_1{-}N{-}Ar_3{-}N{=}N{-}A,} \end{array} \quad (1)$$

wherein $Ar_1$ is a pyridylene group capable of having a substituent; $Ar_2$ and $Ar_3$ are respectively a pyridylene group or an arylene group each capable of having a substituent; and A is a coupler residue having a phenolic OH group.

The above mentioned and other objects and features of the invention will be better understood upon consideration of the following detailed description concluding with specific examples of practice.

DETAILED DESCRIPTION OF THE INVENTION

In the above-mentioned formula (1), the pyridylene group (or divalent pyridyl group) denoted by $Ar_1$, $Ar_2$ or $Ar_3$ refers to a divalent group $C_5H_3N$ derived from pyridine by removal of two hydrogen atoms, preferably one having the structure of

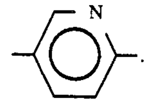

On the other hand, the arylene group denoted by $Ar_2$ or $Ar_3$ refers to a divalent aromatic group derived from an arene by removal of two hydrogen atoms from two carbon atoms of the nucleus, such as phenylene, biphenylene, naphthylene and anthrylene. Examples of the substituent which these divalent groups can have, include halogen (such as fluoro, chloro, bromo, iodo); alkyl group (such as methyl, ethyl, propyl, butyl); alkoxy (methoxy, ethoxy, propoxy, butoxy); aryloxy group (such as phenyloxy); substituted amino group (such as dimethylamino, diethylamino, dibenzylamino, pyrrolidino, piperidino, morpholino); nitro group, cyano group, and acyl group (such as acetyl, benzoyl).

It is particularly preferred that the $Ar_2$ and $Ar_3$ are a pyridylene group or a phenylene group.

Further, examples of the coupler residue group having a phenolic OH group denoted by A in the formula (1), include those represented by the following formulas (5)-(11):

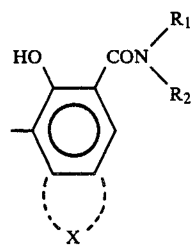

(5)

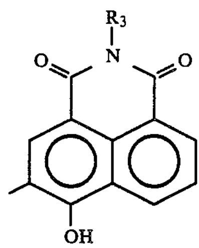

(6)

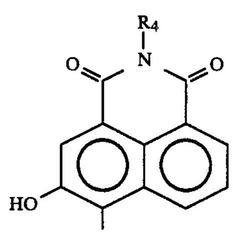

(7)

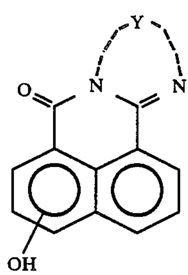

(8)

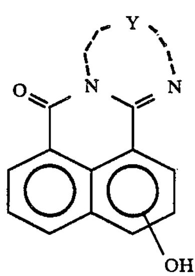

(9)

-continued

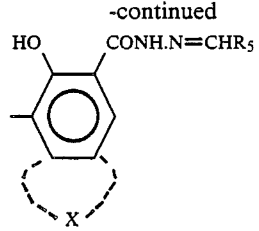

(10)

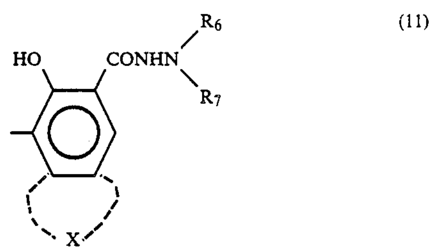

(11)

In the formulas (5)-(11), X is a residue group condensed with the benzene ring to form a polycyclic aromatic ring or heterocyclic ring each capable of having a substituent; $R_1$ and $R_2$ are respectively hydrogen, alkyl, aralkyl, aryl or a heterocyclic group or residue groups forming in combination a cyclic amino group together with the nitrogen atom; $R_3$ and $R_4$ are respectively an alkyl, aralkyl or aryl each capable of having a substituent; Y is a divalent aromatic hydrocarbon group or a residue group forming a divalent heterocyclic group together with the nitrogen atoms; $R_5$ is an aryl or heterocyclic group; $R_6$ and $R_7$ are respectively an alkyl, aralkyl, aryl, heterocyclic, or residue group forming a cyclic amino group together with the nitrogen atom.

Examples of the above-mentioned polycyclic aromatic ring formed through condensation with the benzene ring include those of naphthalene, anthracene, carbazole, benzcarbazole, dibenzofuran, benzonaphthofuran, and diphenylene sulfide. These polyaromatic ring can have a substituent as described above.

For $R_1$ and $R_2$, examples of the alkyl include methyl, ethyl, propyl, and butyl; examples of the aralkyl include benzyl, phenethyl, and naphthylmethyl; examples of he aryl include phenyl, diphenyl, naphthyl, and anthryl. Examples of the heterocyclic ring include those of carbazole, dibenzofuran, benzimidazole, benzthiazole, thiazole and pyridine.

Examples of the alkyl, aralkyl and aryl groups for $R_3$ and $R_4$ may include those enumerated above as examples of $R_1$ and $R_2$.

As for the group Y, examples of the divalent aromatic hydrocarbon group include monocyclic aromatic hydrocarbon group such as o-phenylene; and condensed polycyclic aromatic hydrocarbon groups such as o-naphthylene, perinaphthylene, 1,2-anthrylene, and 9,10-phenanthrylene. Further, examples of the divalent heterocyclic group formed by the combination of the residue group and the nitrogen atoms include 5- or 6-membered heterocyclic divalent groups, such as 3,4-pyrazole-di-yl, 2,3-pyrimidine-di-yl, 4,5-pyrimidine-di-yl, 6,7-indazole-di-yl, 5,6-benzimidazole-di-yl, and 6,7-quinoline-di-yl. These groups can have a substituent.

Examples of the aryl or heterocyclic group for $R_5$ include phenyl, naphthyl, anthryl, pyrenyl; or pyridyl, thienyl, furyl, carbazolyl. These groups can have a substituent as mentioned above.

For $R_6$ and $R_7$, examples of the alkyl, aryl and aralkyl may be the same as those enumerated above. Examples of the heterocyclic group include those of carbazole, dibenzofuran, benzimidazolone, benzthiazole, triazole and pyridine.

Each of the groups $R_1$-$R_7$ can have a substituent, for example, a halogen radical such as fluoro, chloro, bromo, iodo; an alkyl group such as methyl, ethyl, propyl, butyl; an alkoxy group such as methoxy, ethoxy, butoxy; a substituted amino group such as dimethylamino, diethylamino, dibenzylamino, pyrrolidino, morpholino; an aryl group such as phenyl, naphthyl, biphenyl; nitro, cyano and trifluoromethyl.

A particularly noticeable effect is obtained when the group A in the general formula (1) is one represented by the following formula (12):

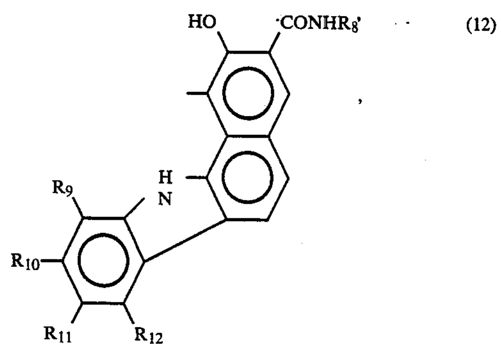

wherein $R_8$ is an alkyl, aryl, aralkyl or heterocyclic group those exemplified for $R_1$ and $R_2$ (each capable of having a substituent), or a group of

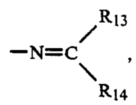

wherein $R_{13}$ and $R_{14}$ are respectively a hydrogen atom, an alkyl, aryl, aralkyl or heterocyclic group or residue groups forming in combination a 5- or 6-membered ring group together with the carbon atom bonded. These groups can have a substituent. $R_9$, $R_{10}$, $R_{11}$ and $R_{12}$ are respectively a hydrogen atom, a halogen atom, such as fluorine, bromine, chlorine or iodine, or a hydroxyl, nitro, trifluoromethyl, cyano, alkyl, alkoxy group, or an aryl, aralkyl or amino group capable of having a substituent. Each of the group $R_8$-$R_{12}$ can have a substituent like those exemplified above for the groups $R_1$-$R_7$. Further, $R_9$ and $R_{10}$, $R_{10}$ and $R_{11}$, or $R_{11}$ and $R_{12}$ can form a condensed aromatic ring with the benzene ring as a part of these carbazole structure. A most remarkable effect with respect to the elongation of sensitive wavelength region and improved sensitivity is obtained when the group is one represented by the formula (13):

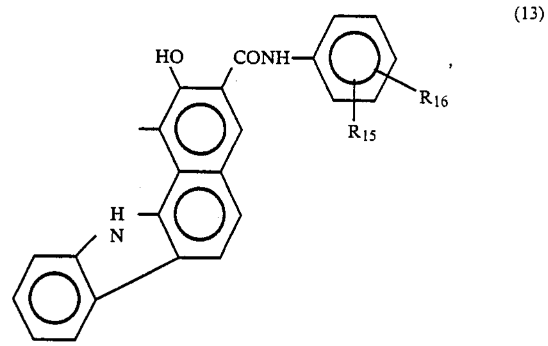

wherein $R_{15}$ and $R_{16}$ are respectively a hydrogen atom, a halogen atom, a nitro, cyano, trifluoromethyl, or an alkyl, aryl, alkoxyl or amino each capable of having a substituent like that for the groups $R_1$-$R_7$. Especially when the group $R_{15}$ is $-C_2H_5$ attached to the ortho position, the best result is attained.

While not intended to be limited to any theory, in the azo pigment of the present invention represented by the formula (1), it is considered that the lone pair of the nitrogen atom in the structure of

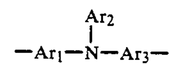

ensures conjugation among the azo groups in the pigment molecule, whereby there results in spreading of a region where photogenerated charges are freely moved so that the absorption wavelength region is expanded to the longer wavelength side and the movement of charges is well effected. Further, the pyridylene group is considered to have a function of increasing the ionization potential of the azo pigment to improve the carrier injection to the charge transporting material. As a result, if the azo pigment represented by the formula (1) is contained in the photosensitive layer, either one or both of carrier generation efficiency and carrier transportation efficiency are improved to increase the sensitivity and the charge stability during a continuous use.

The photosensitive member for electrophotography containing the azo pigment according to the present invention generally has a good sensitivity and a good potential stability during continuous use, and tends to have a sensitive wavelength region expanded to a longer wavelength side. This tendency of elongation in wavelength is particularly noticeable for the compounds having a group A represented by the formula (13), most of which show sensitivity to over 750 nm including some showing sensitivity over 800 nm.

As described above, by using the azo pigment of the present invention in an organic photoconductor layer, there is provided a photosensitive member having a high sensitivity and an elongated sensitive wavelength region, which is useful as a photosensitive member for electrophotography in general as a matter of course and is also effectively applicable to a high-speed copying machine, a laser beam printer, an LED printer, a liquid crystal printer, etc. As a stale potential is ensured thereby, it has become possible to provide stable and beautiful images.

Hereinbelow, some representative examples of the azo pigments used in the present invention are enumerated hereinbelow with their structural formulas of the central skeletons and coupler units.
| Central skeleton | Coupler unit |
|---|---|
(1)
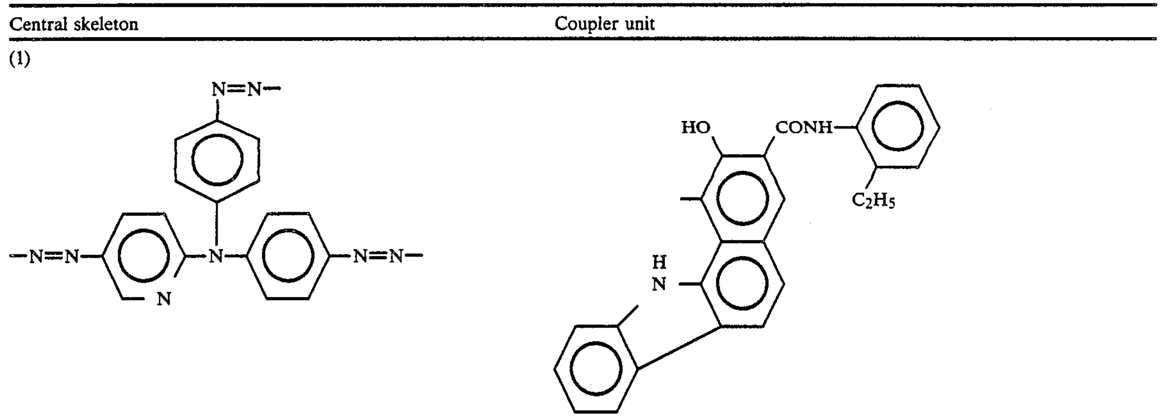
(2)
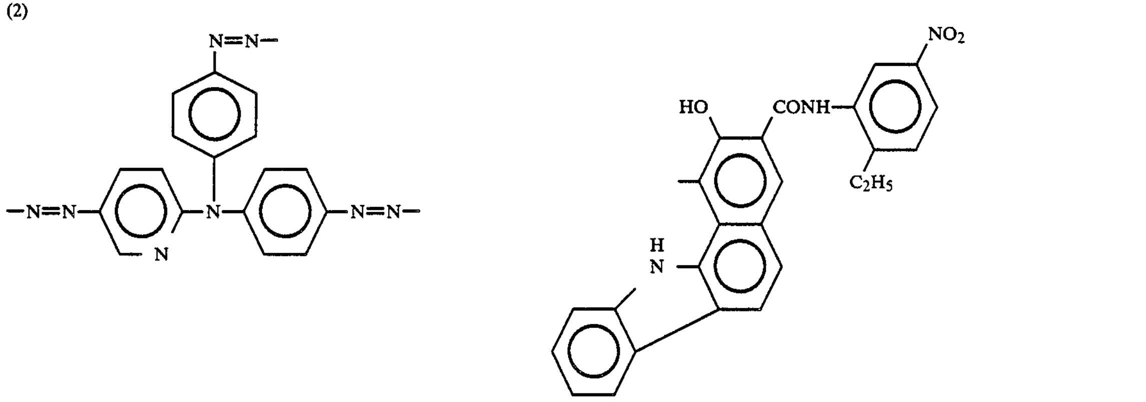
(3)
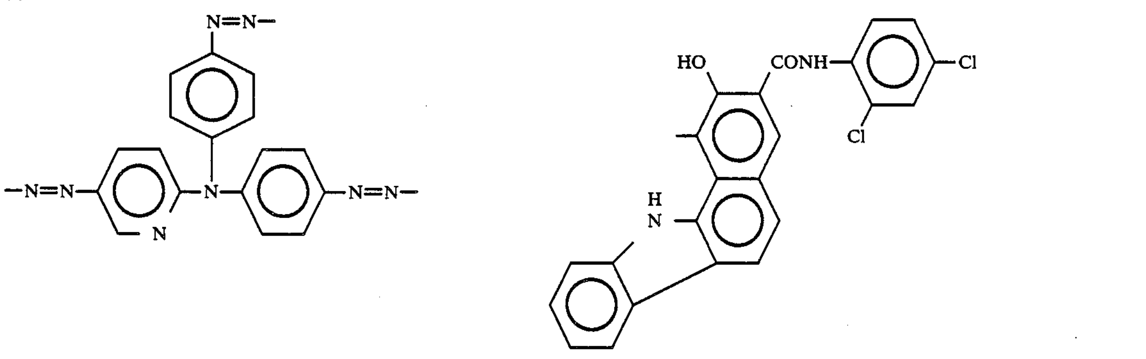
(4)
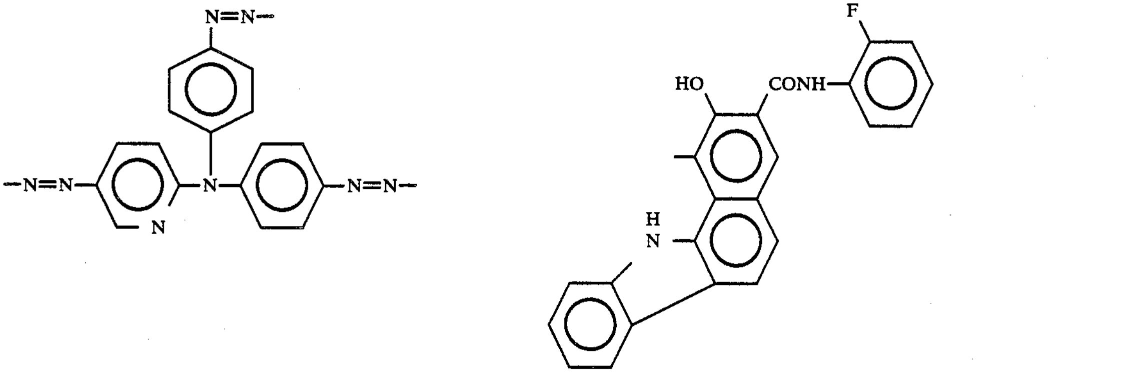
(5)

-continued
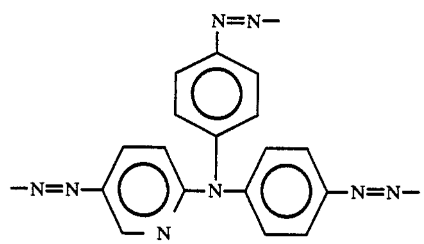
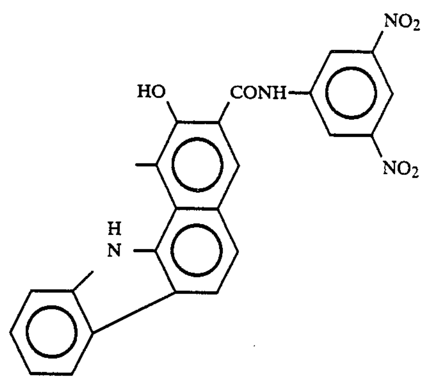
(6)
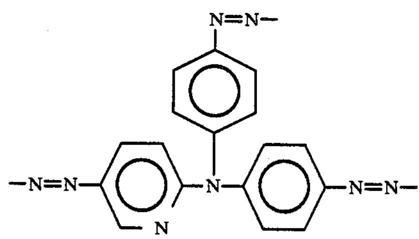
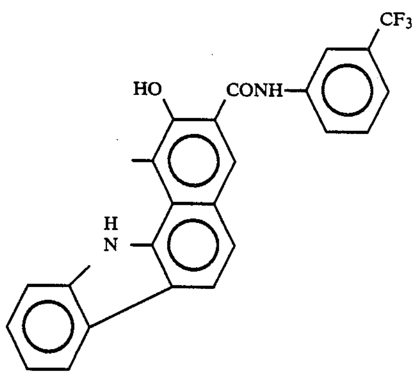
(7)
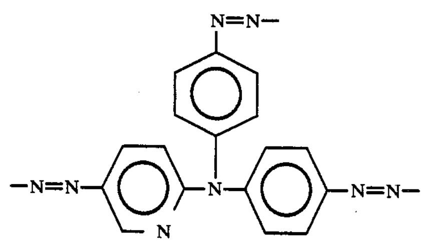
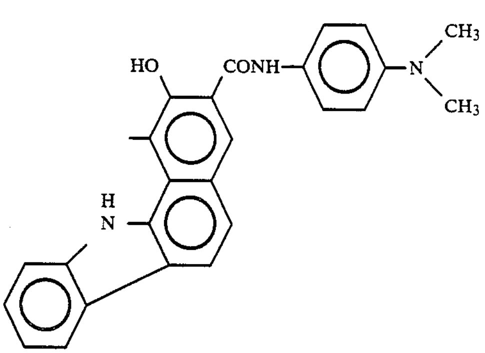
(8)
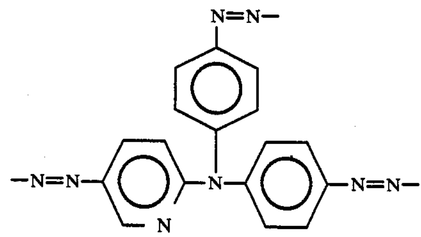
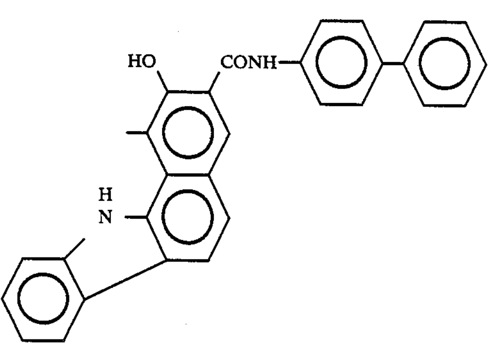
(9)

-continued
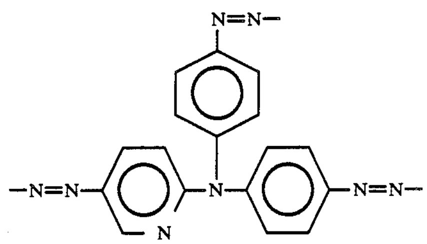
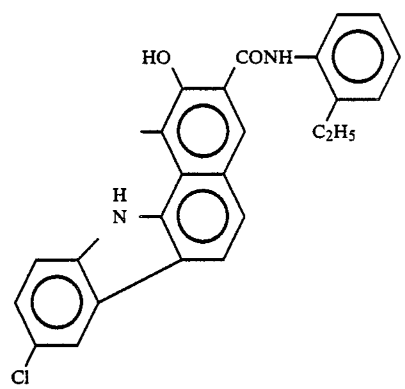
(10)
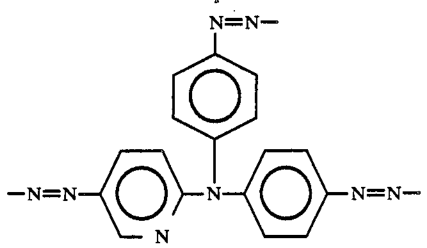
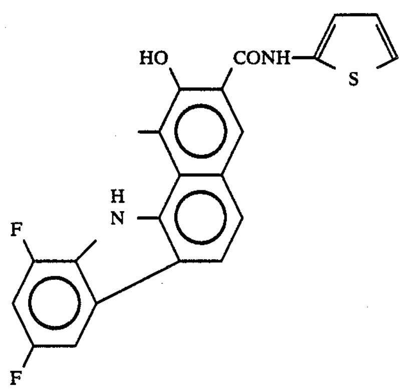
(11)
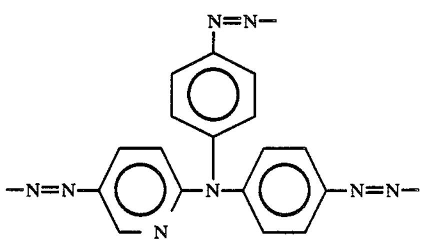
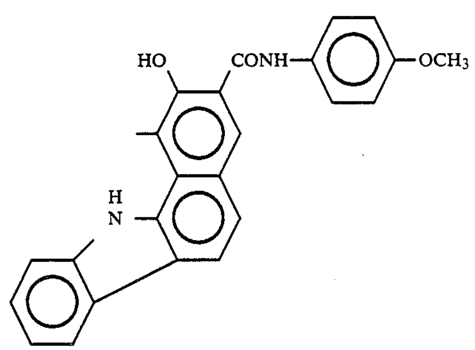
(12)
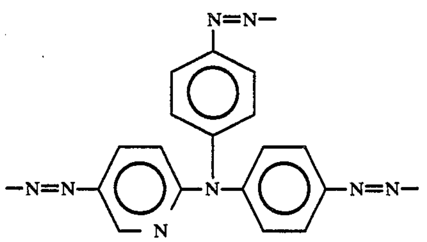
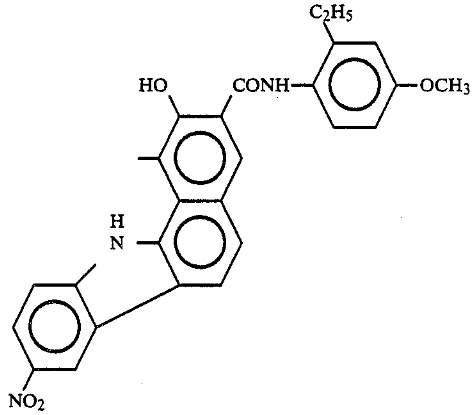
(13)

-continued
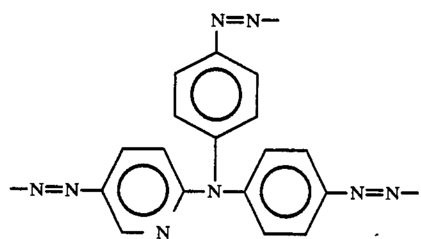
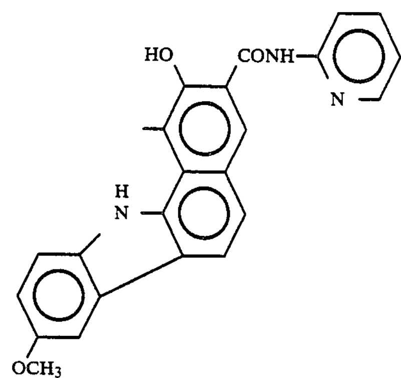
(14)
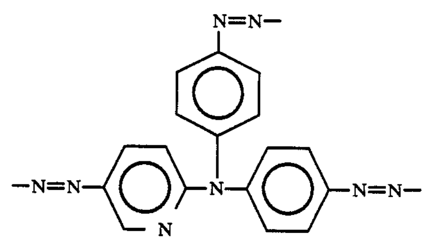
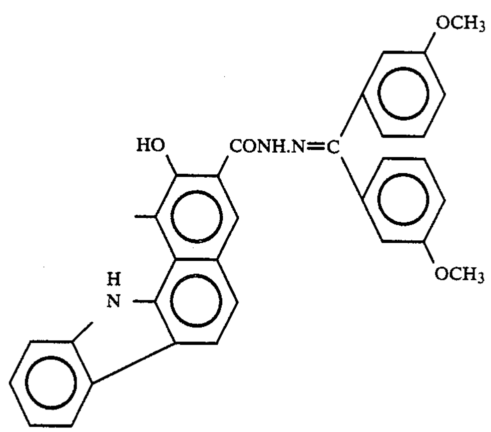
(15)
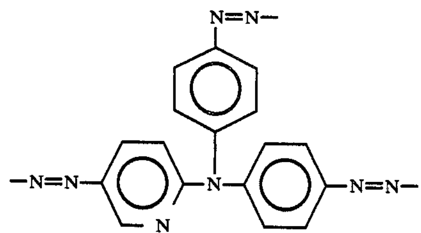
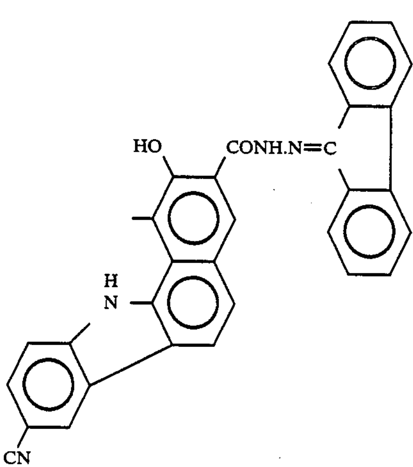
(16)

-continued
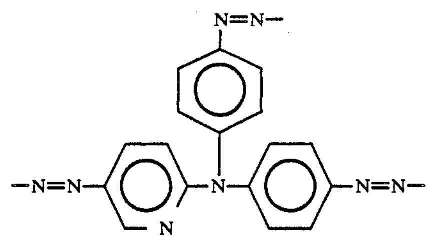
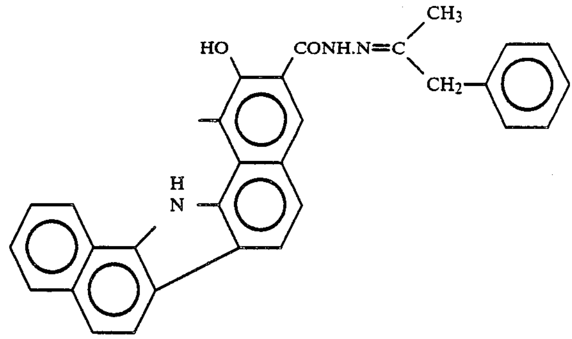
(17)
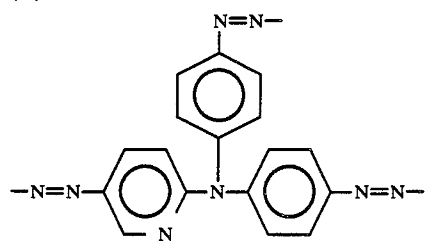
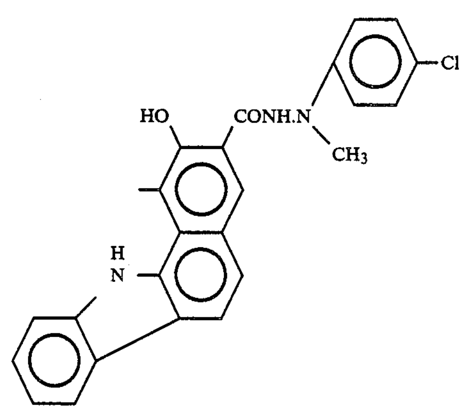
(18)
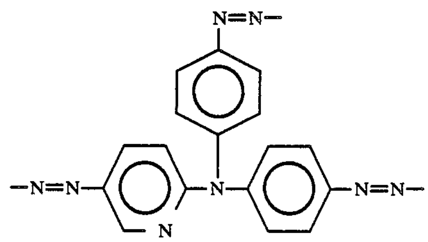
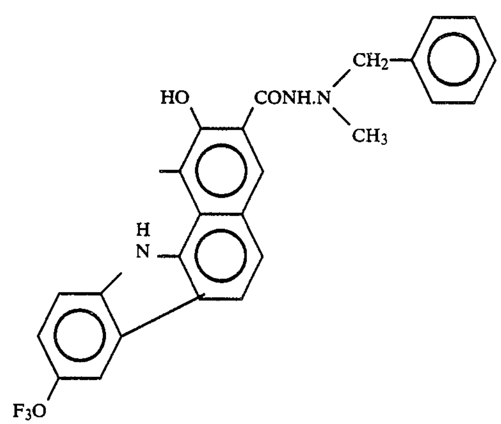
(19)
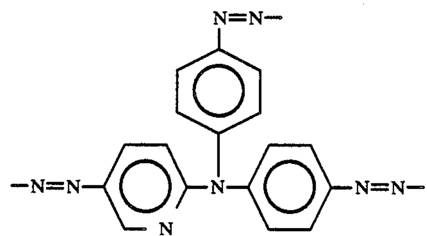
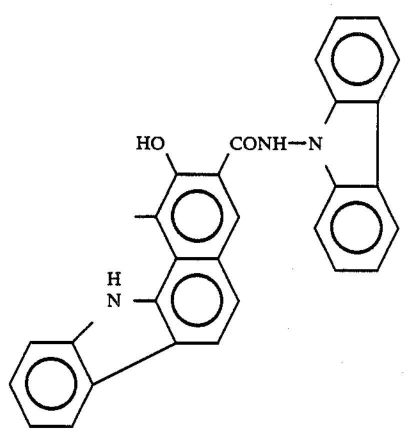

-continued
(20)
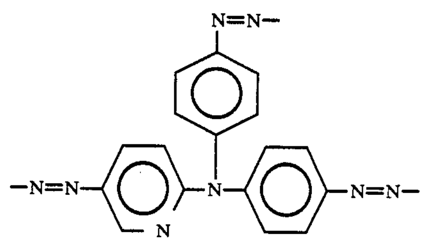
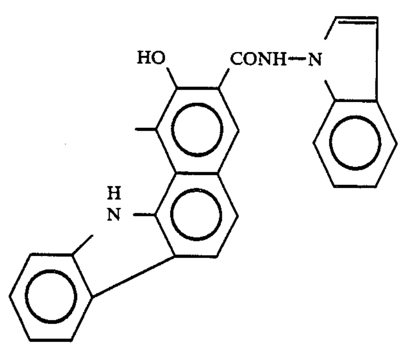
(21)
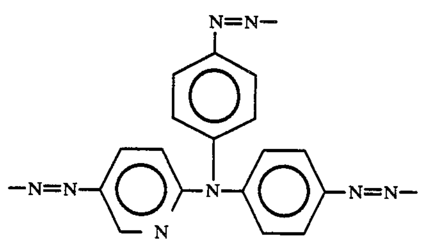
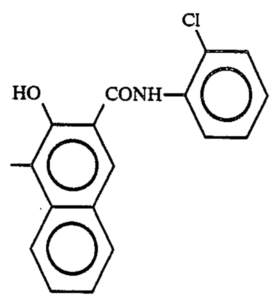
(22)
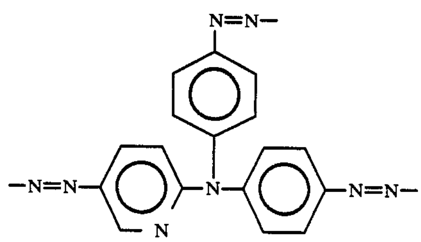
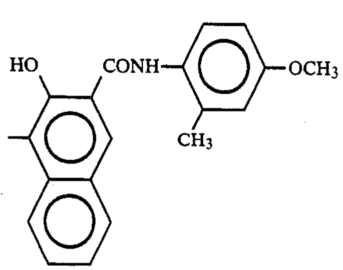
(23)
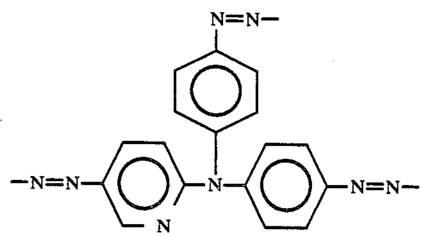
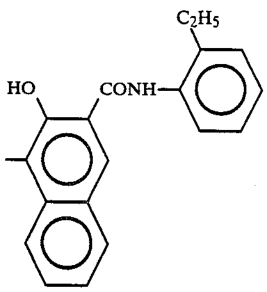
(24)
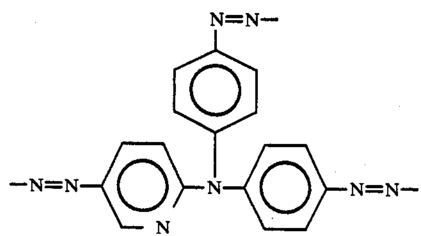
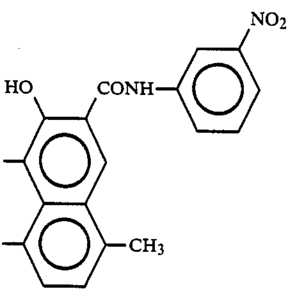
(25)

-continued
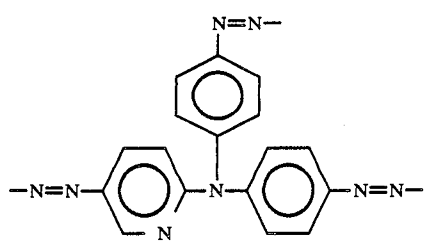
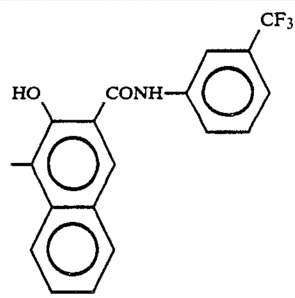
(26)
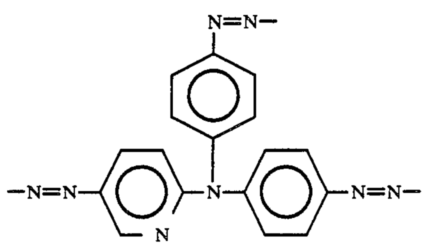
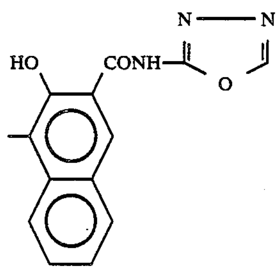
(27)
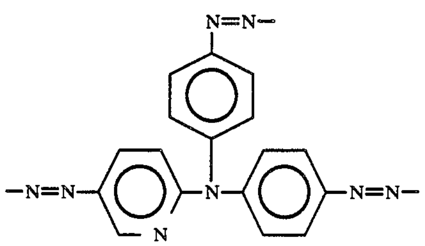
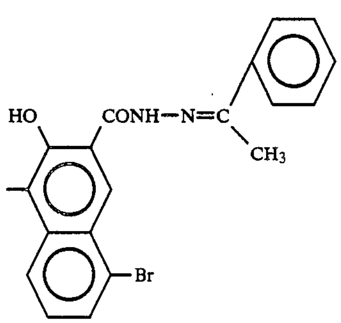
(28)
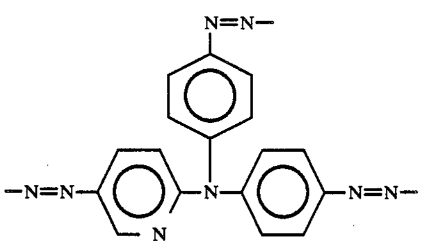
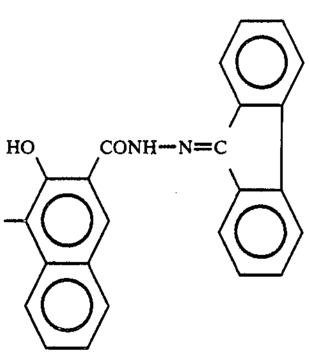
(29)

-continued
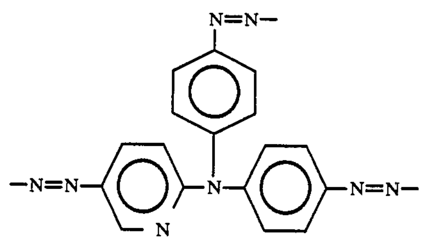
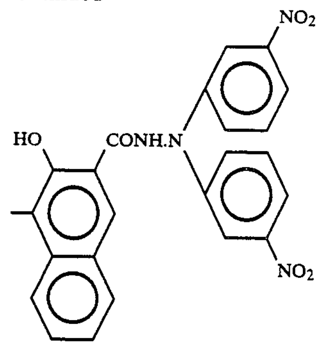
(30)
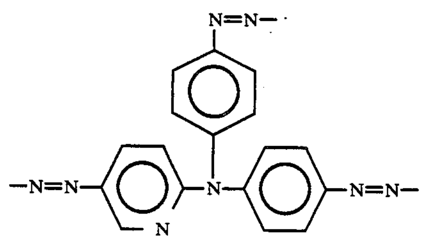
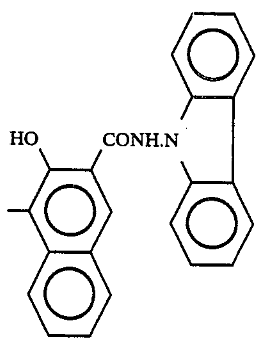
(31)
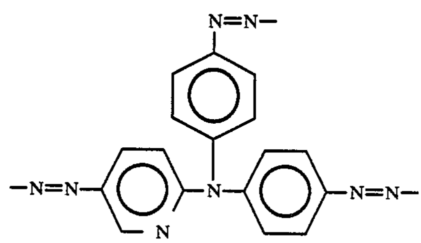
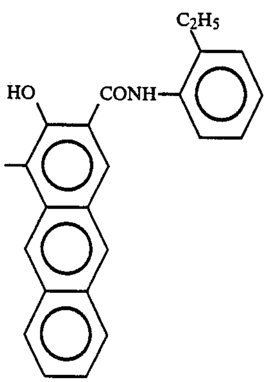
(32)
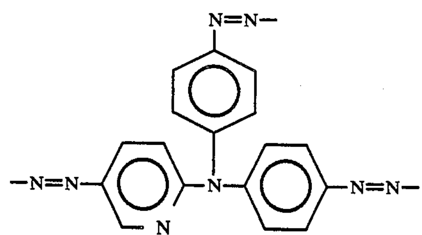
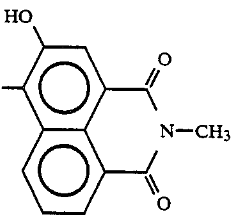
(33)
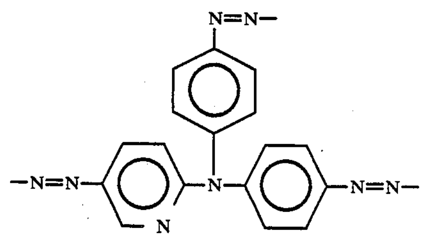
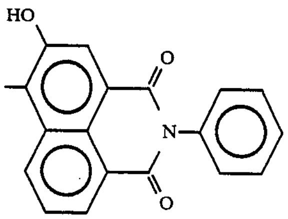
(34)

-continued
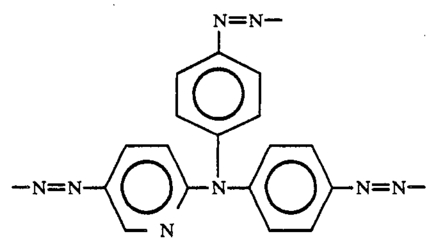
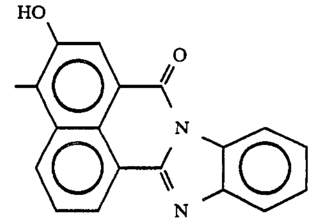
(35)
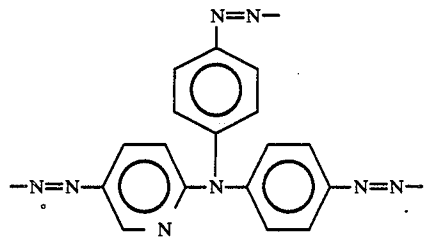
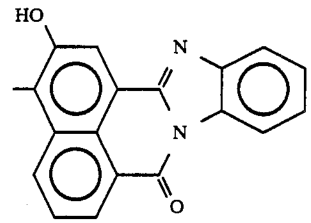
(36)
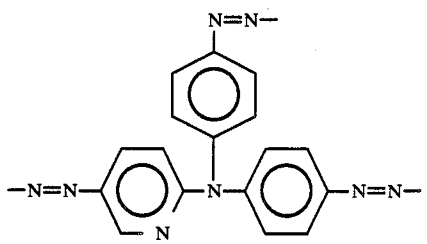
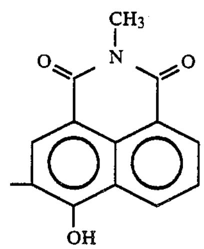
(37)
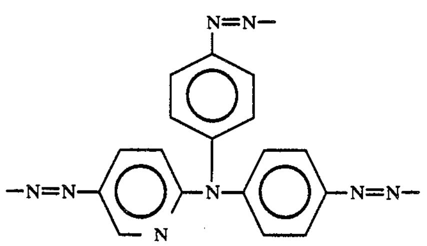
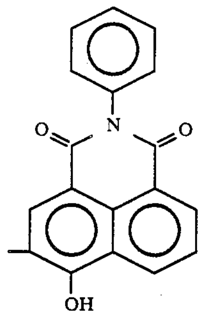
(38)
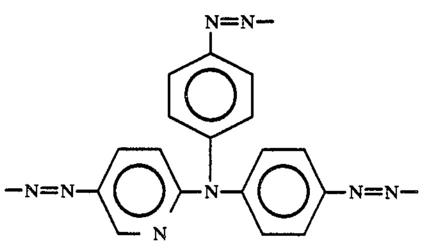
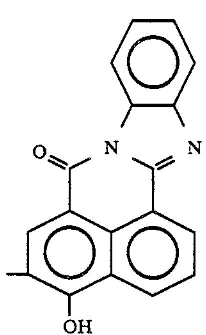
(39)

-continued
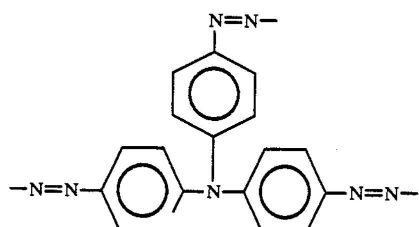
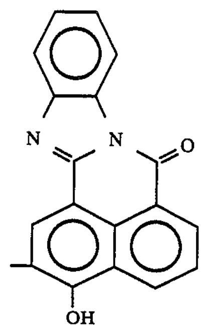
(40)
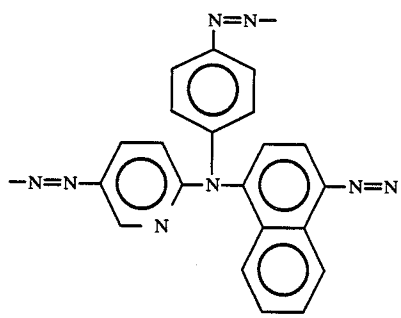
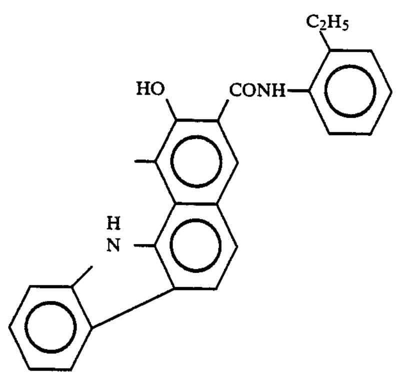
(41)
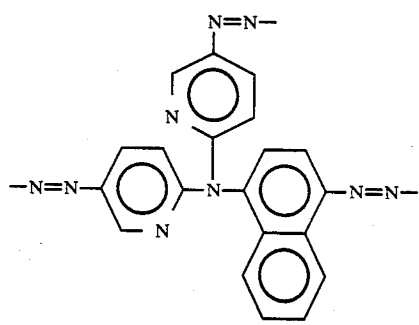
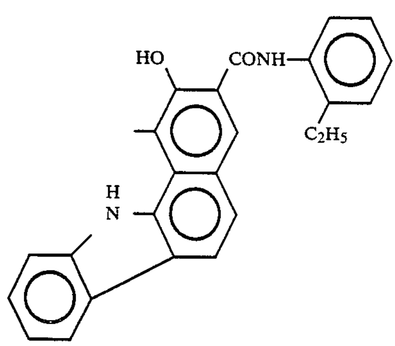
(42)
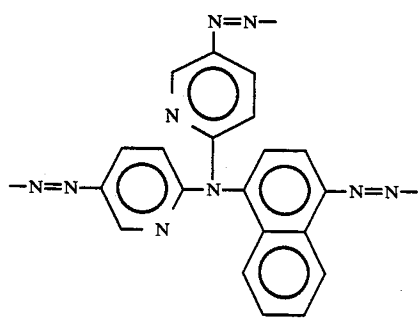
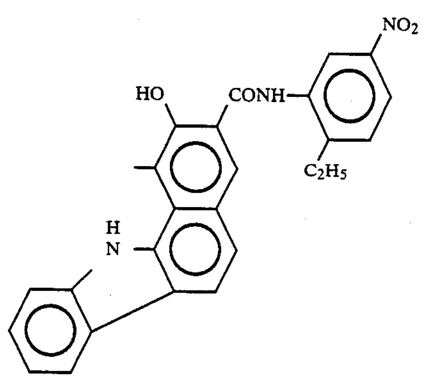
(43)

-continued
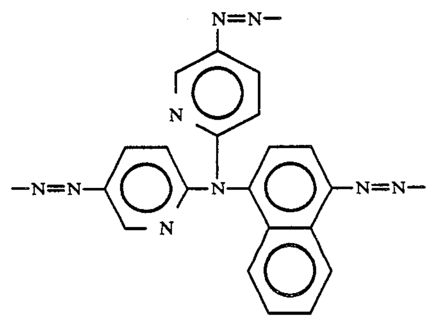
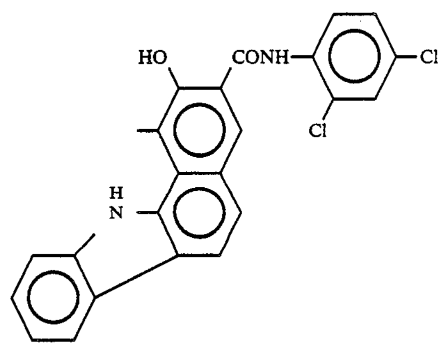
(44)
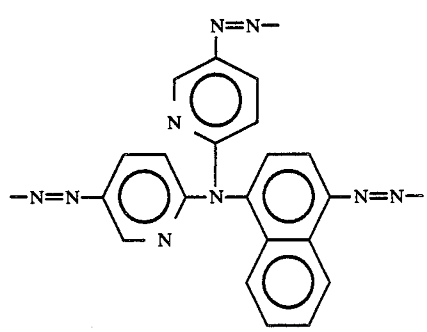
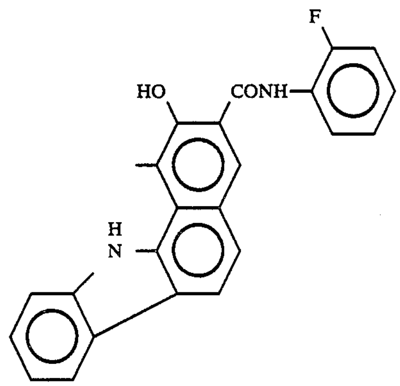
(45)
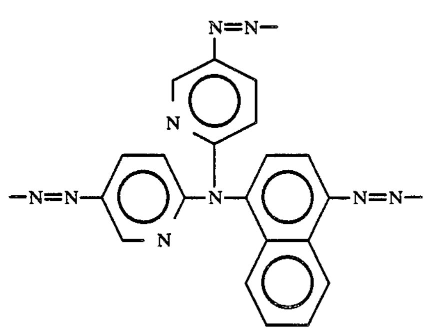
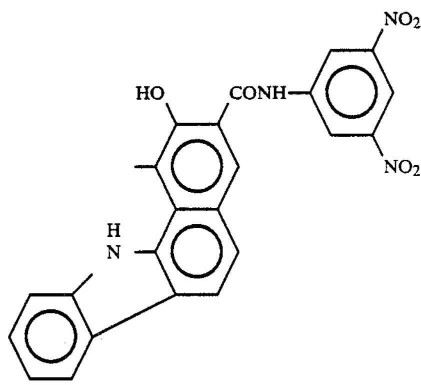
(46)
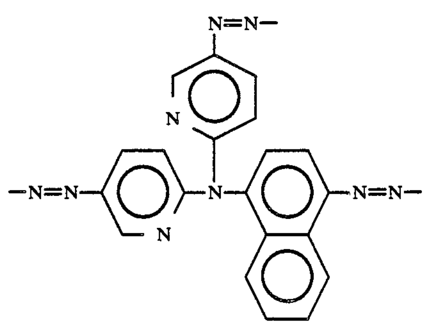
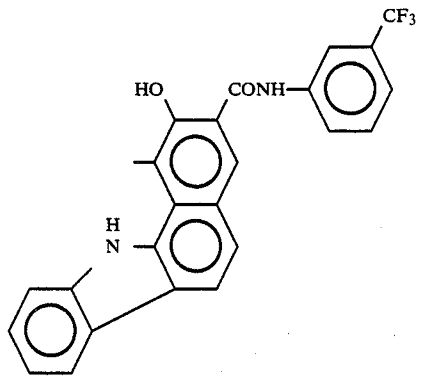
(47)

-continued
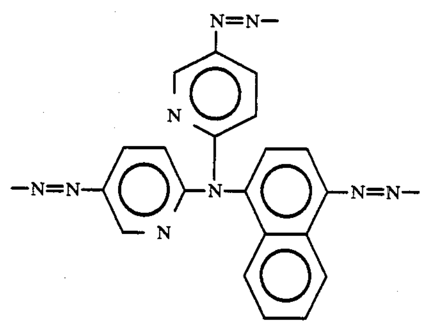
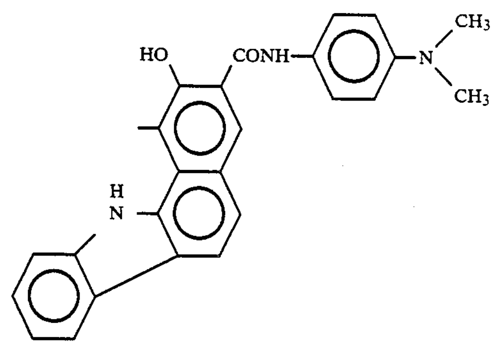
(48)
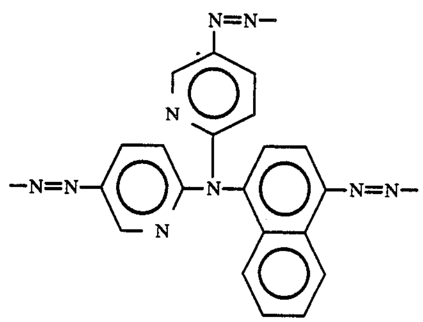
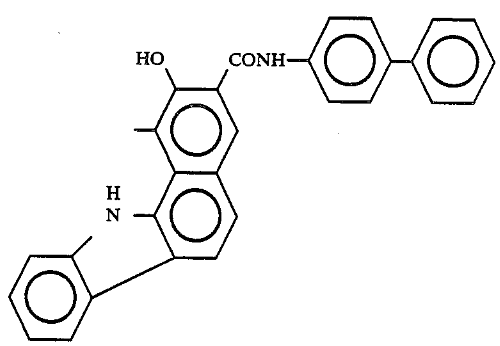
(49)
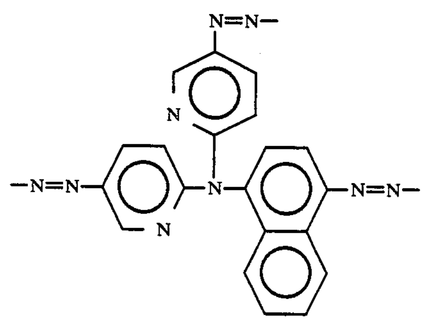
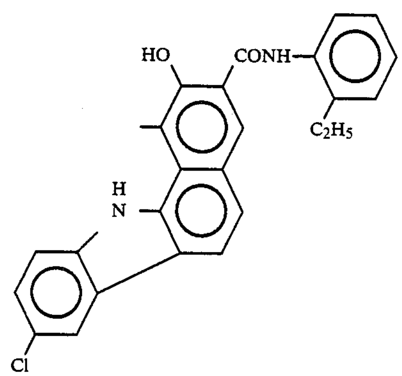
(50)
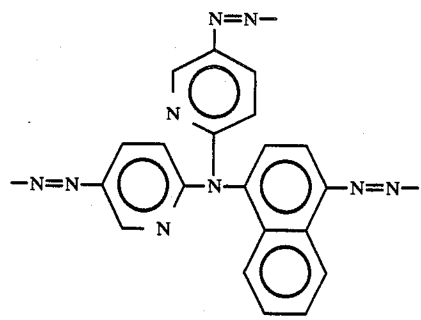
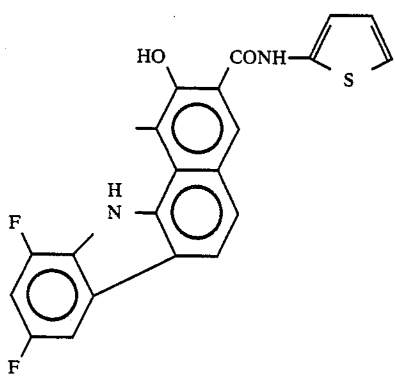
(51)

-continued
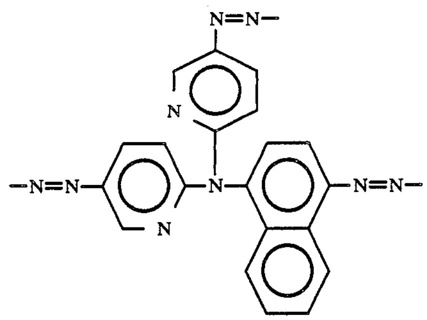
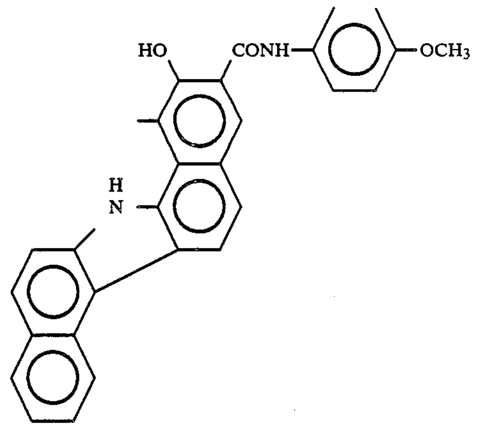
(52)
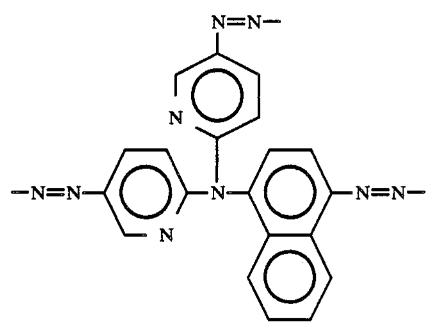
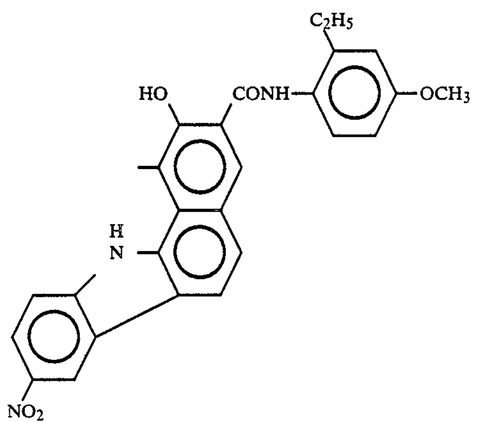
(53)
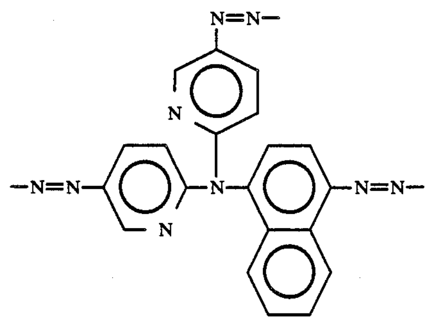
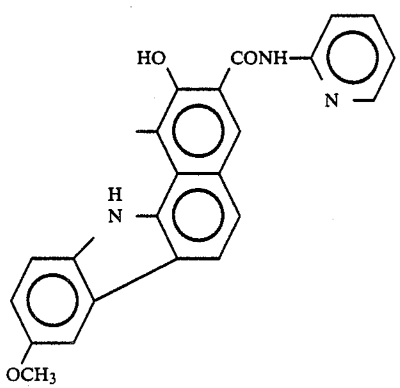
(54)

-continued
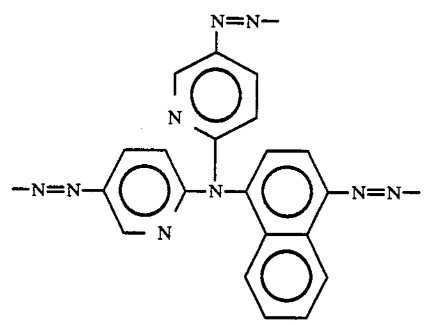
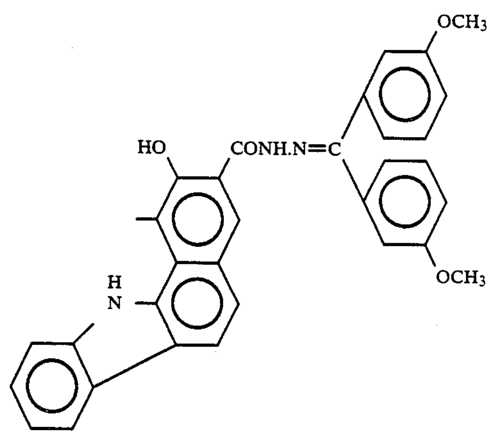
(55)
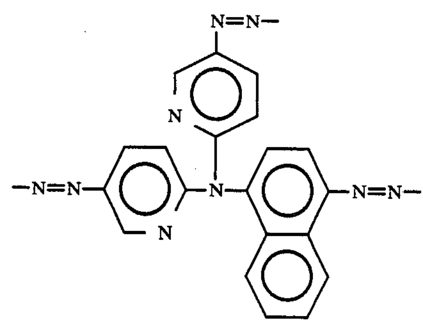
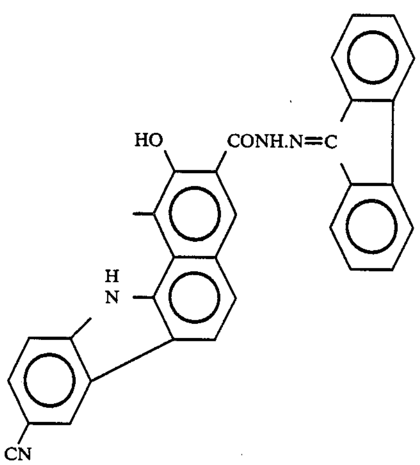
(56)
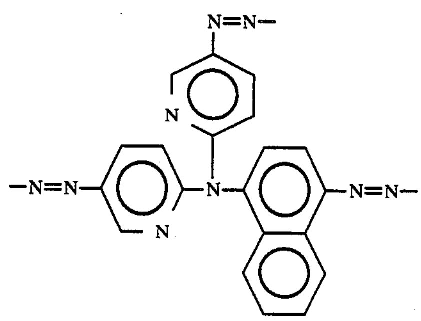
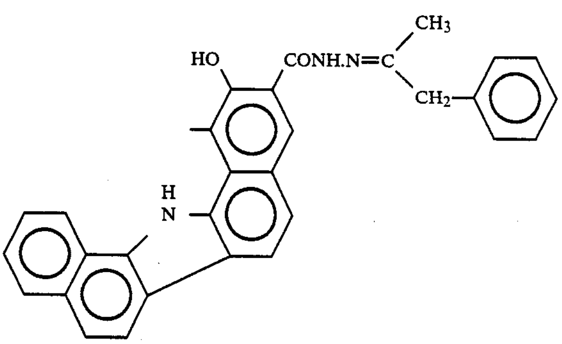
(57)

-continued
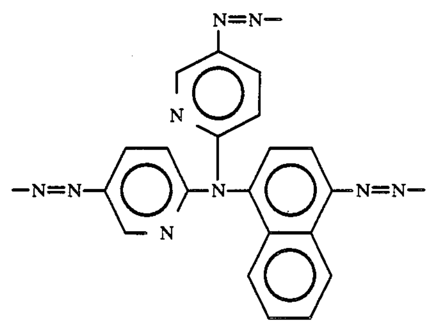
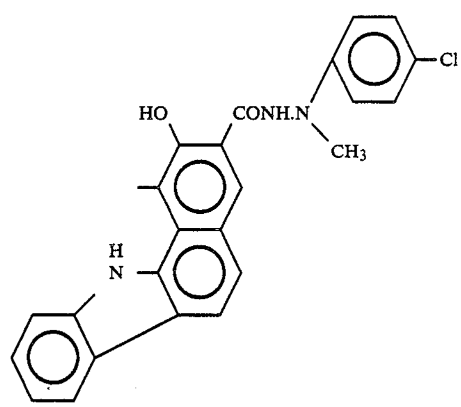
(58)
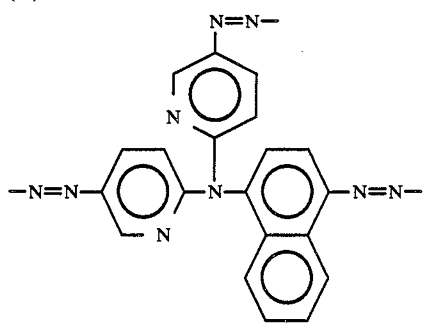
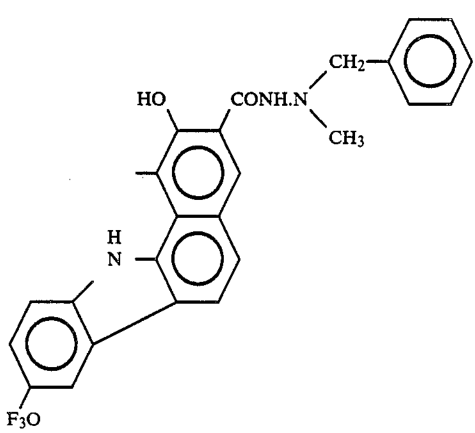
(59)
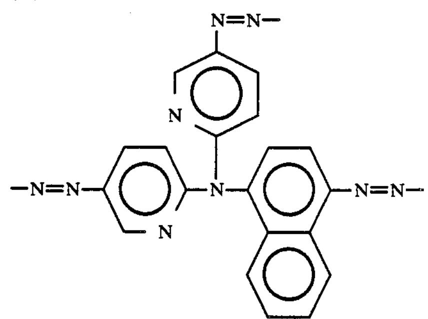
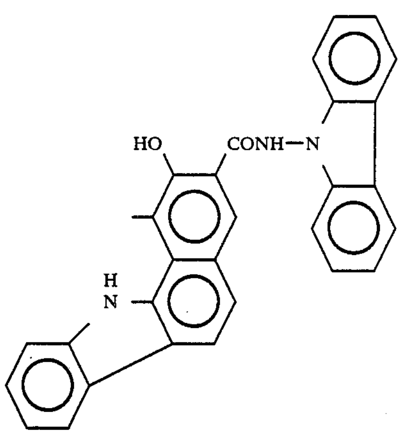
(60)
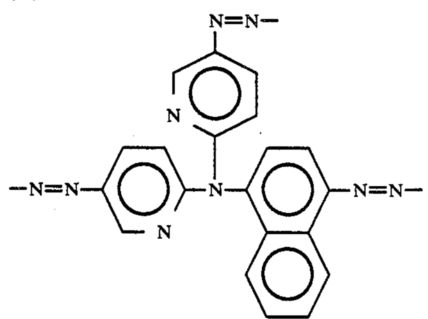
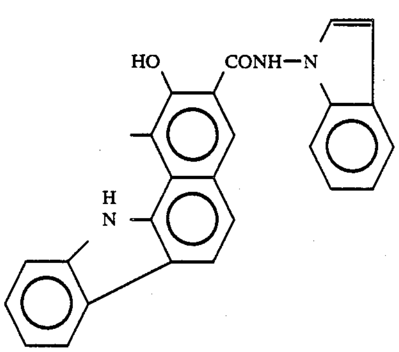

-continued
(61)
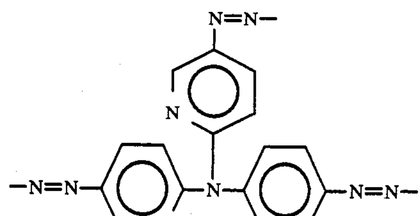
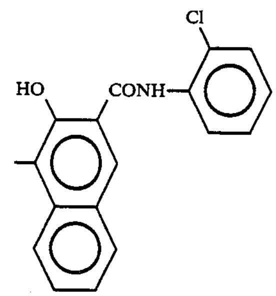
(62)
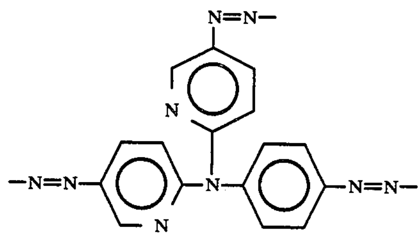
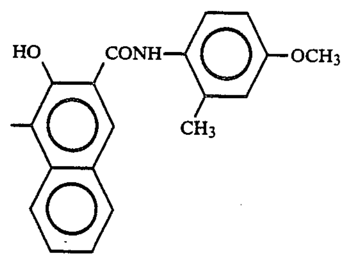
(63)
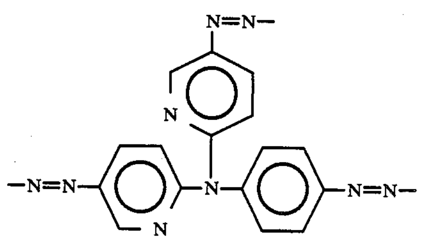
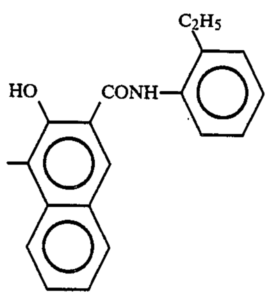
(64)
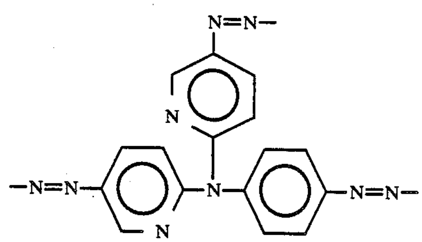
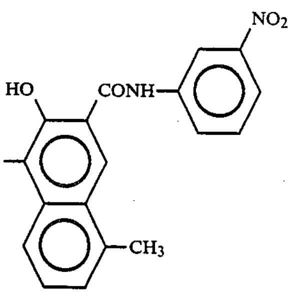
(65)
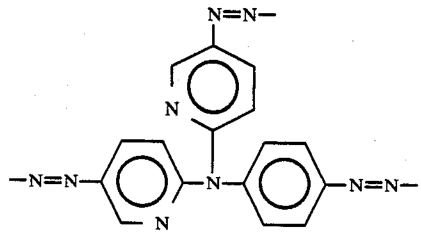
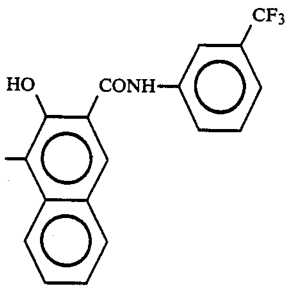
(66)

-continued
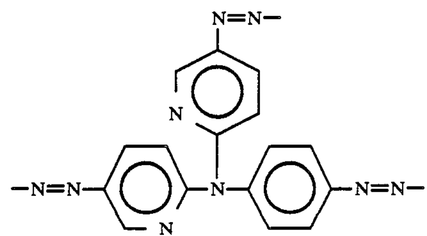
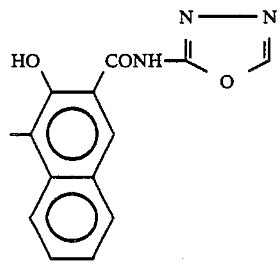
(67)
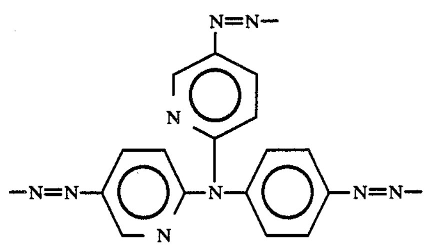
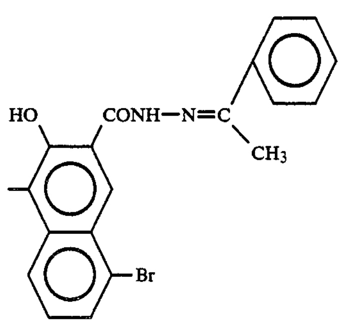
(68)
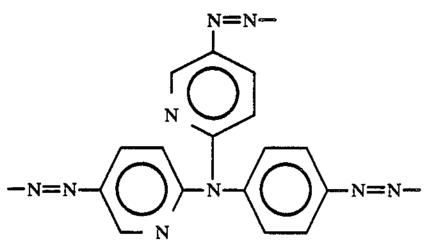
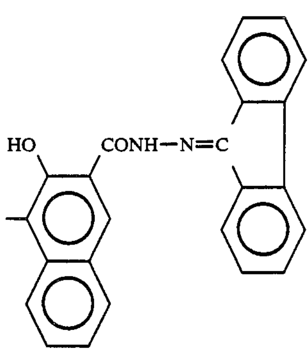
(69)
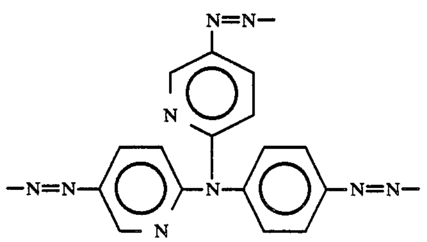
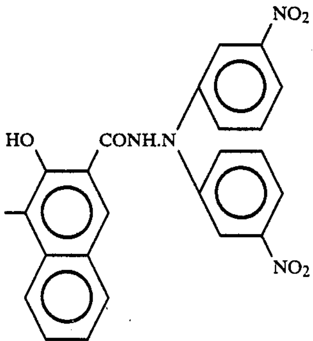
(70)

-continued
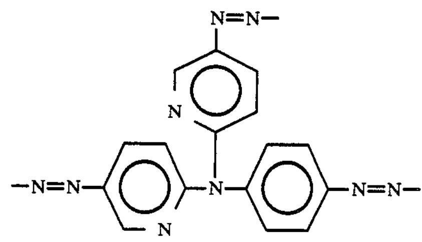
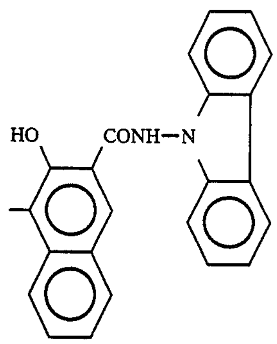
(71)
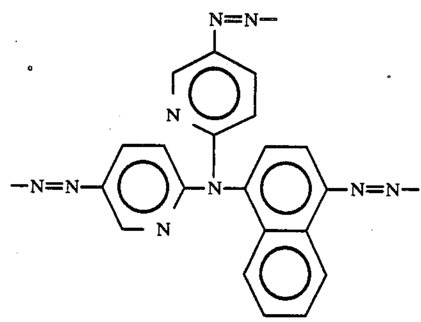
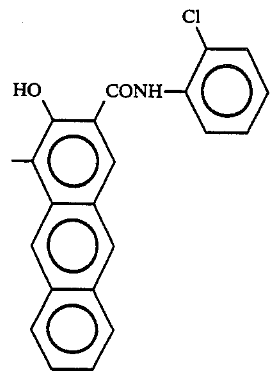
(72)
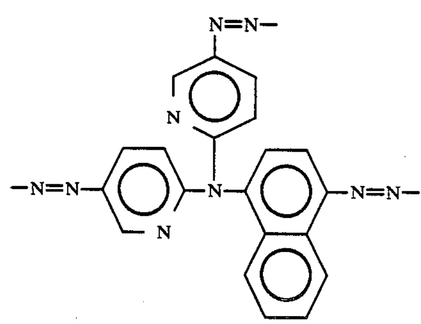
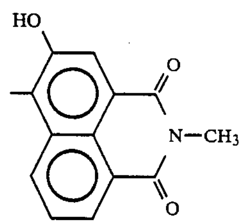
(73)
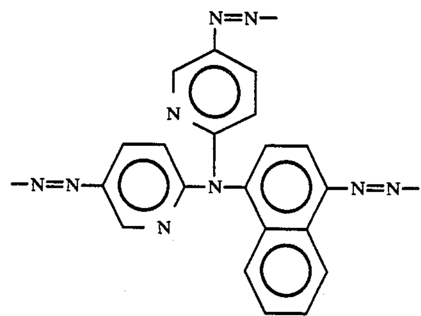
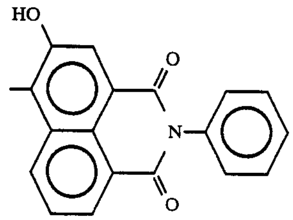
(74)

-continued
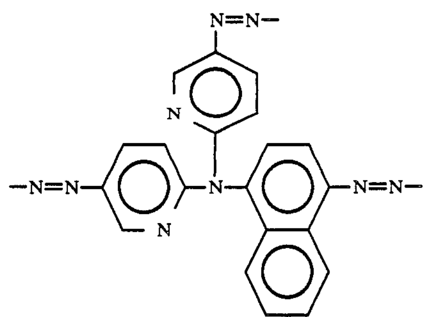
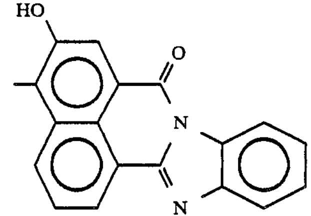
(75)
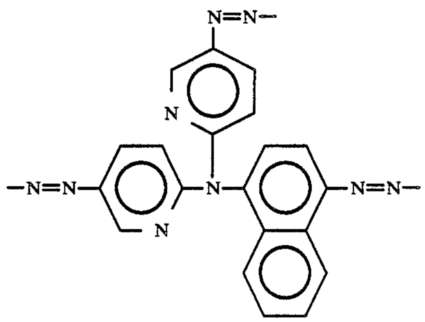
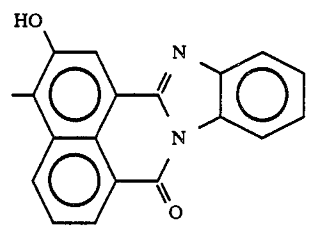
(76)
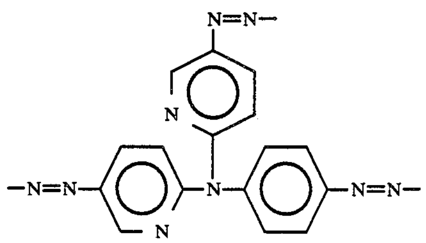
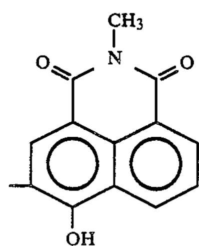
(77)
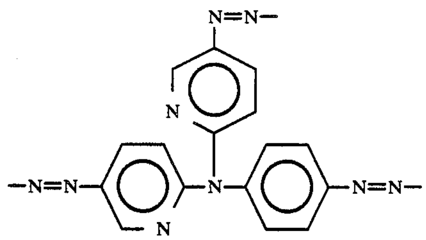
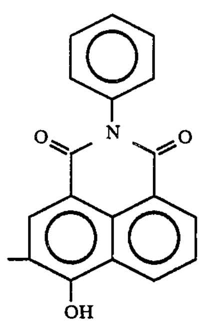
(78)
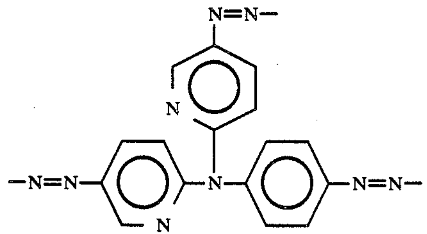
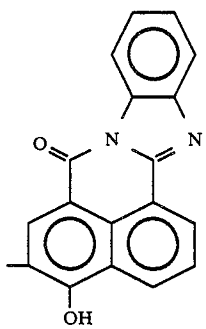

-continued
(79)
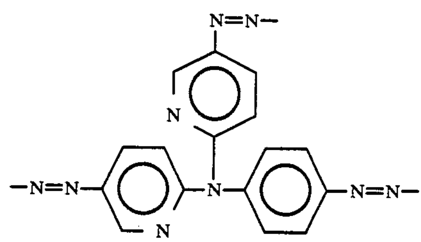
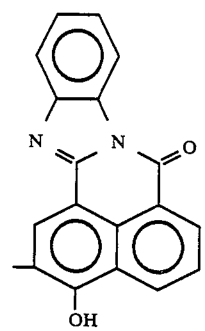
(80)
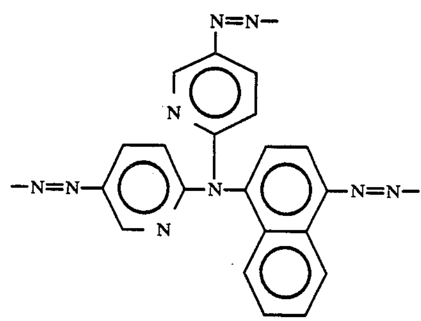
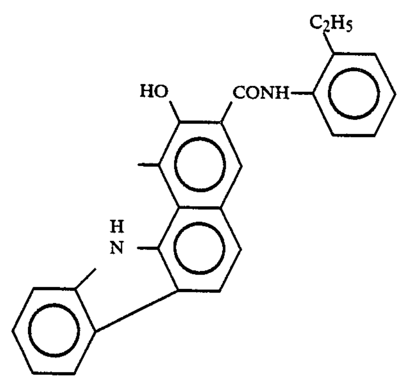
(81)
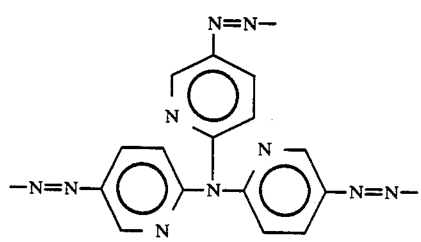
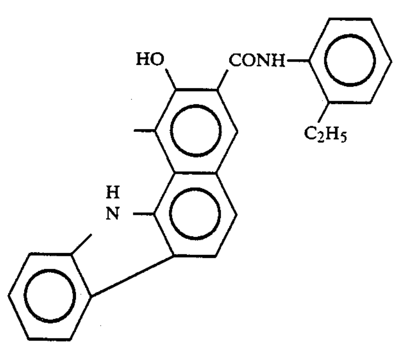
(82)
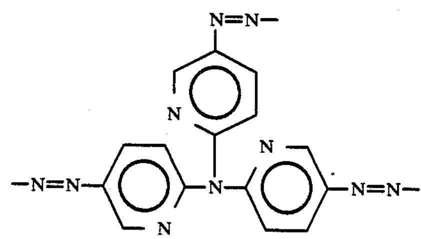
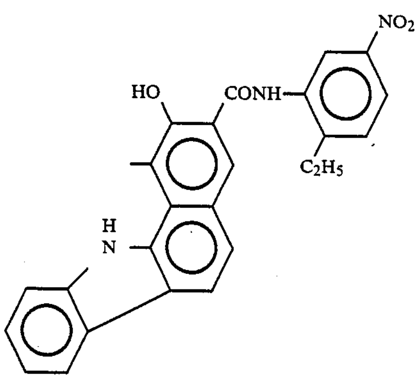
(83)

-continued
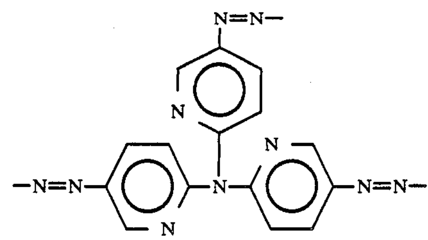
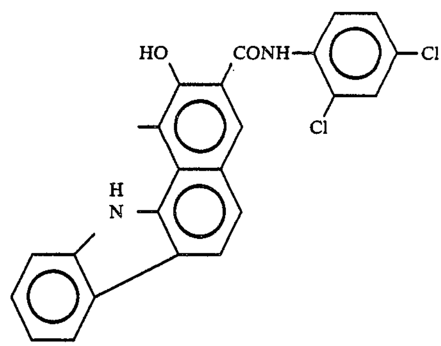
(84)
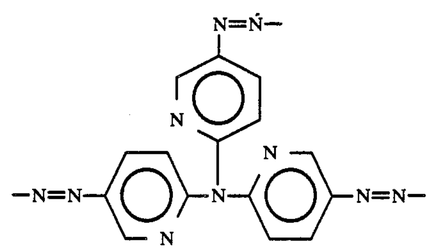
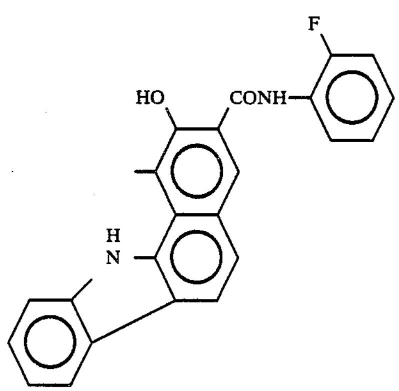
(85)
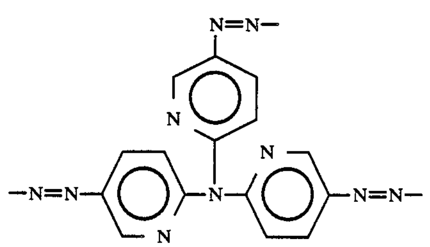
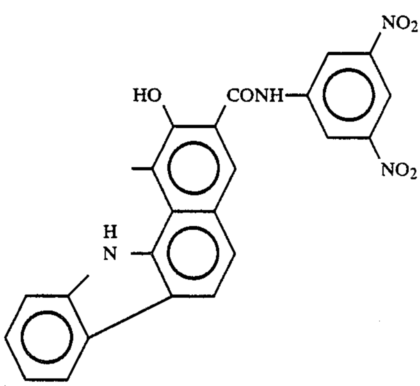
(86)
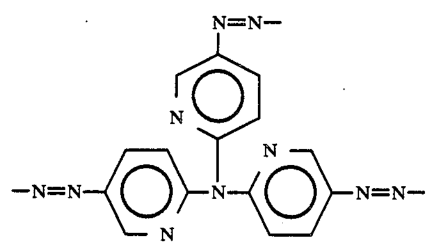
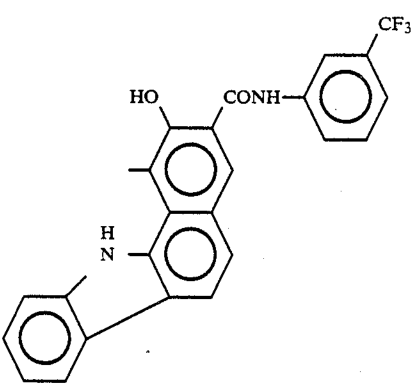
(87)

-continued
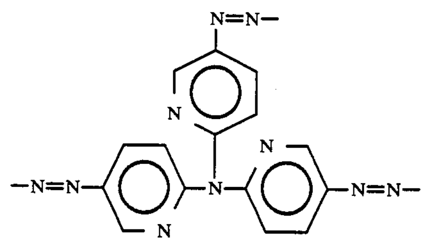
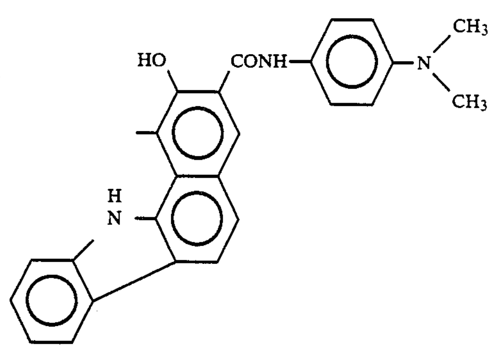
(88)
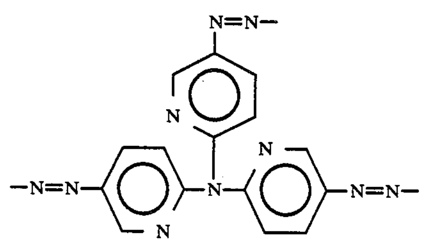
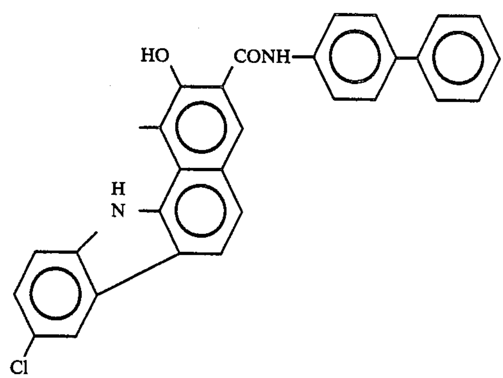
(89)
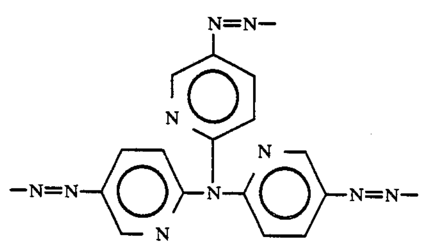
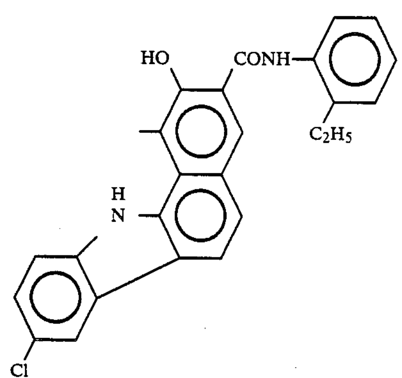
(90)
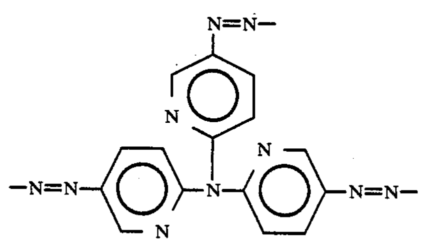
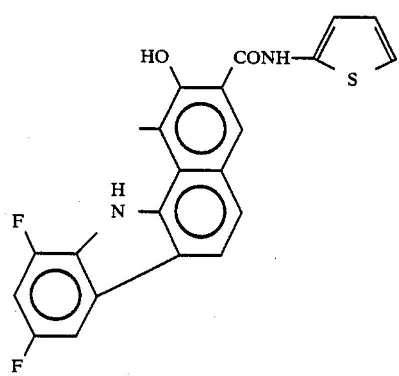
(91)

-continued
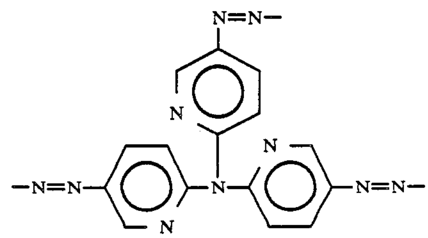
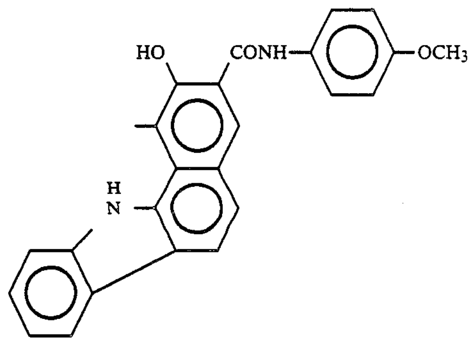
(92)
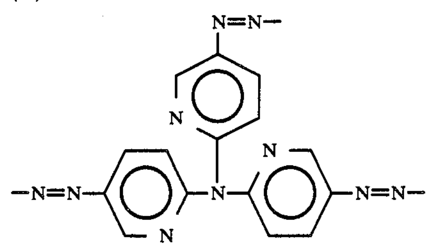
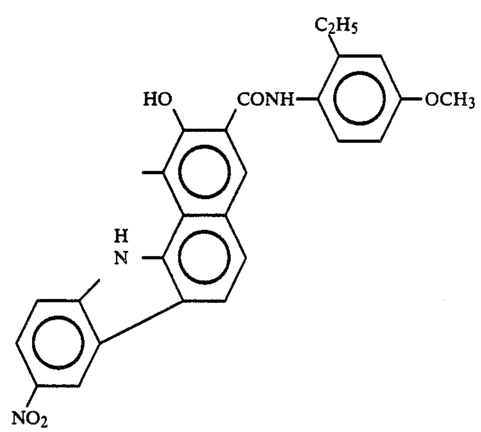
(93)
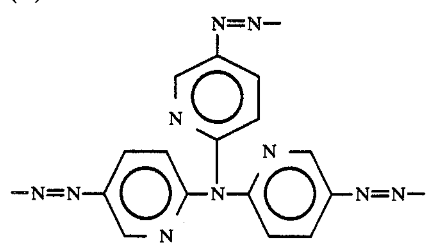
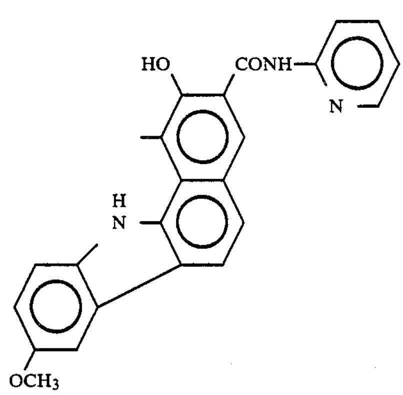
(94)
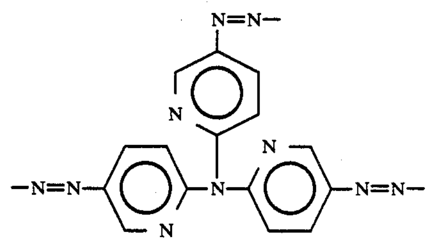
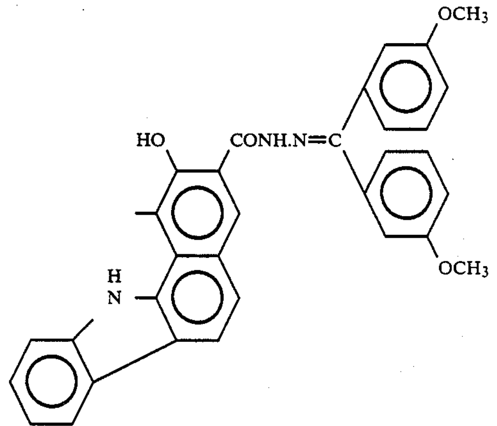
(95)

-continued
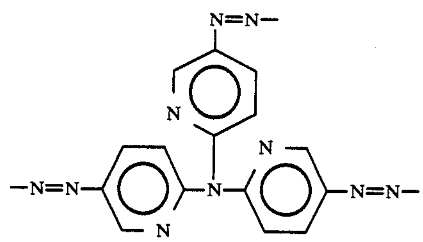
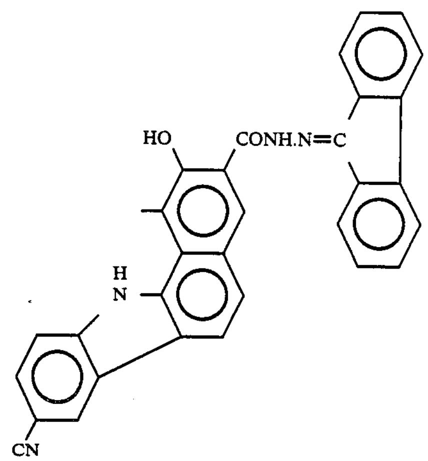
(96)
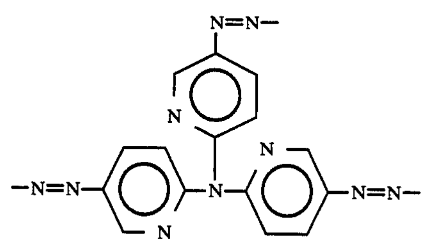
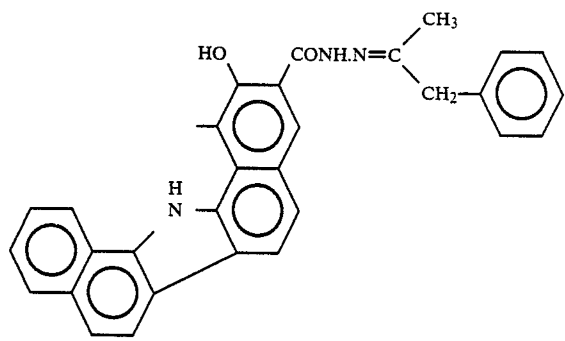
(97)
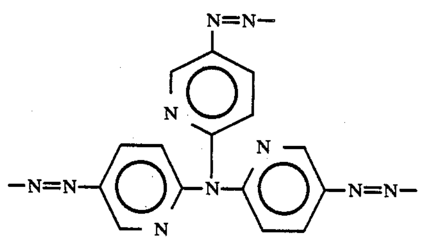
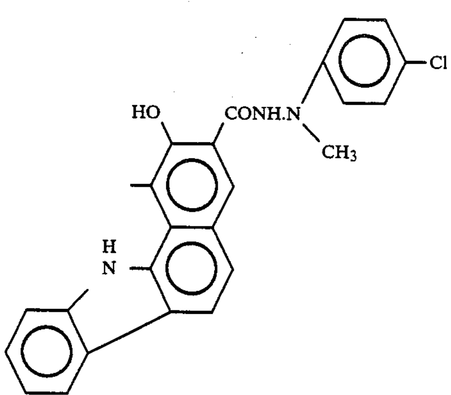
(98)

-continued
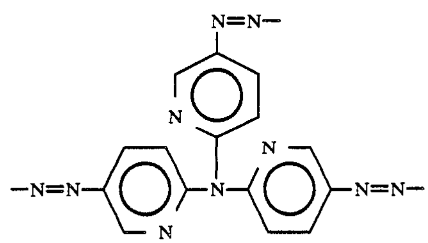
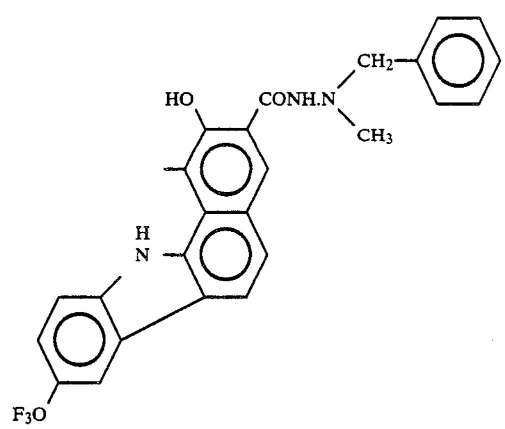
(99)
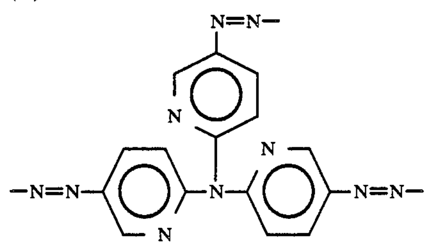
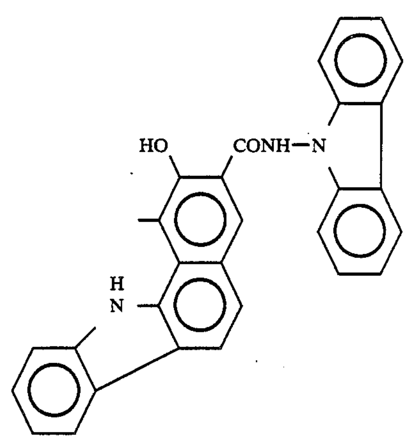
(100)
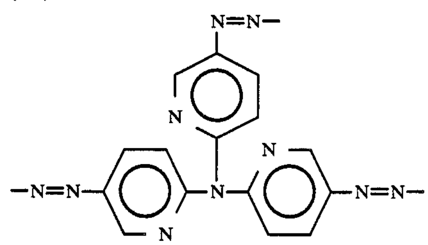
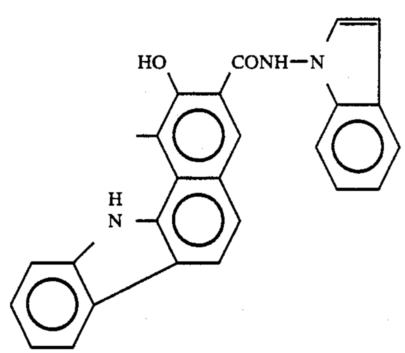
(101)
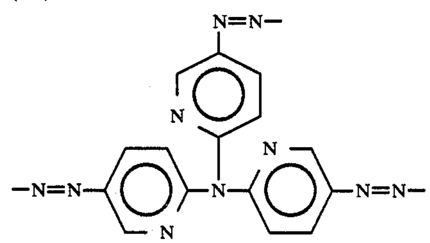
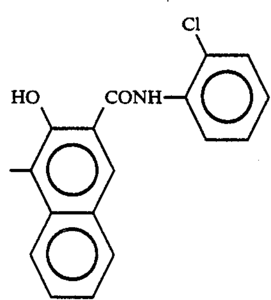
(102)

-continued
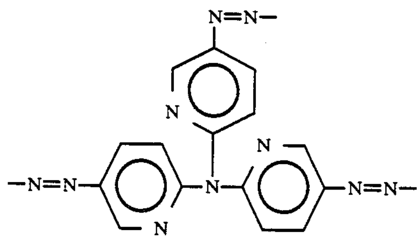
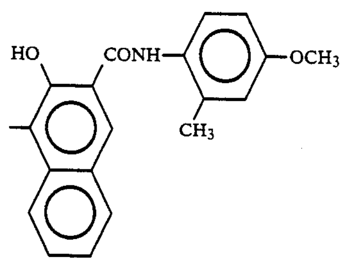
(103)
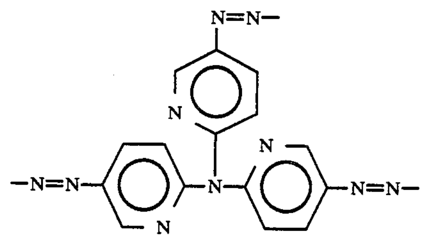
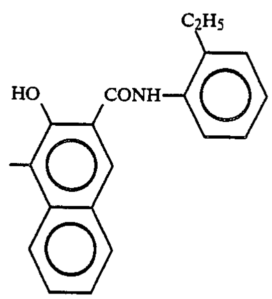
(104)
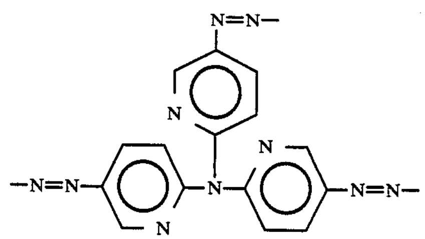
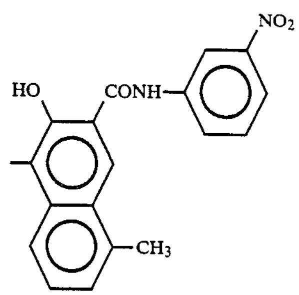
(105)
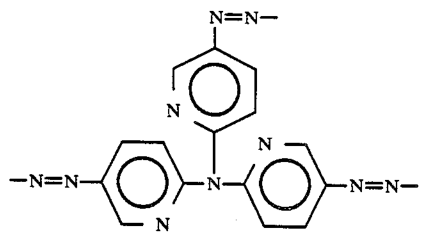
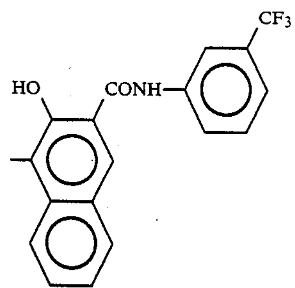
(106)
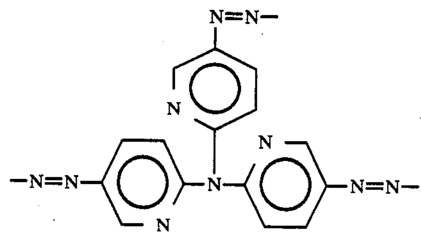
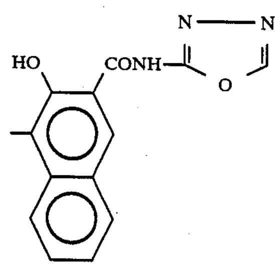
(107)

-continued
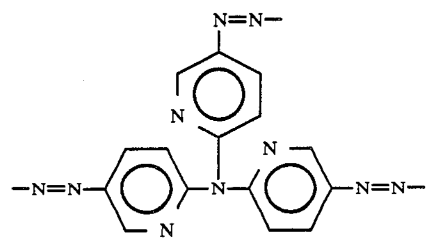
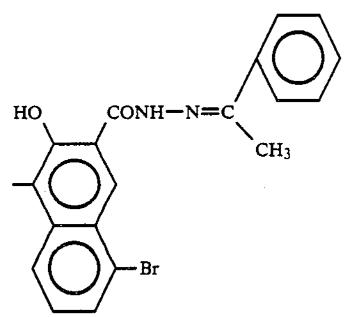
(108)
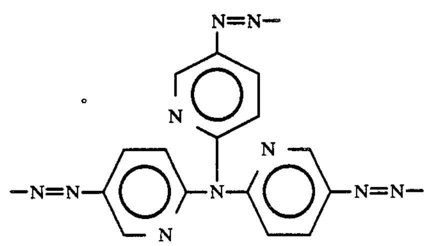
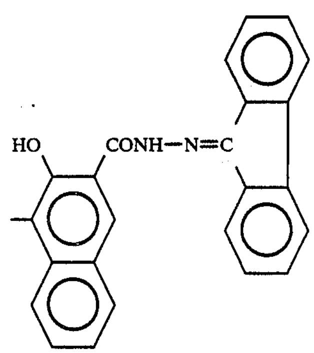
(109)
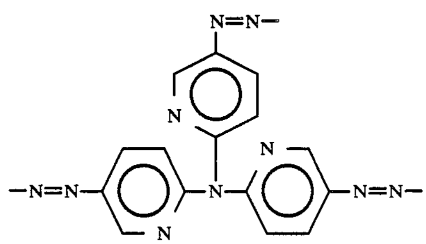
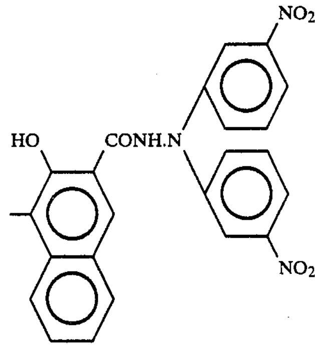
(110)
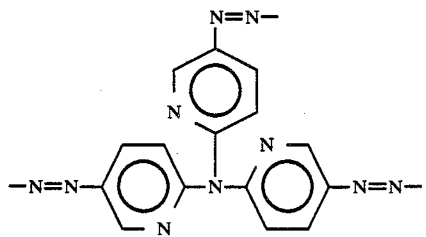
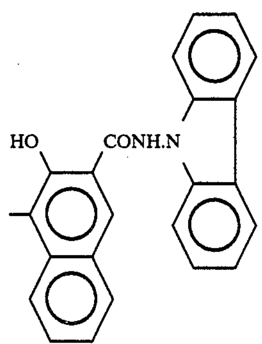
(111)

-continued
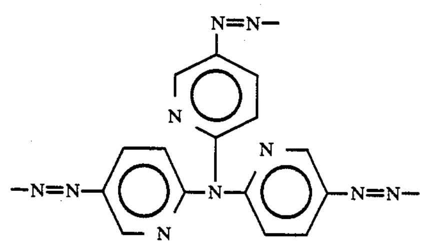
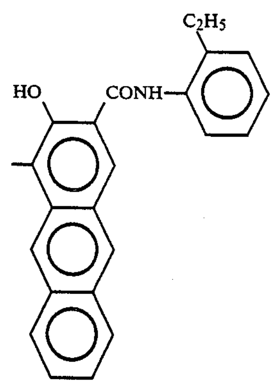
(112)
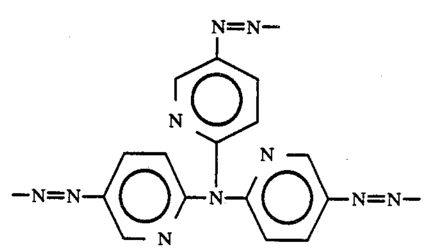
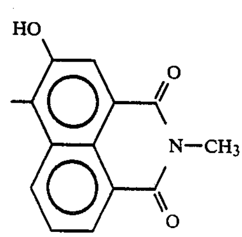
(113)
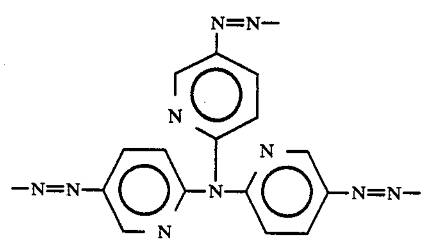
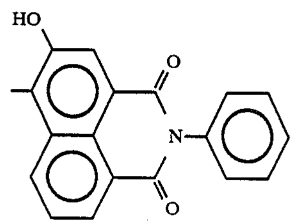
(114)
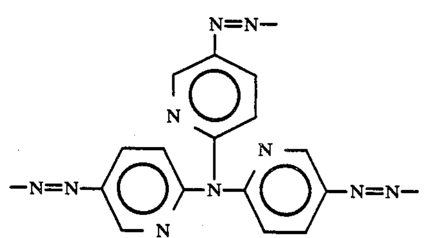
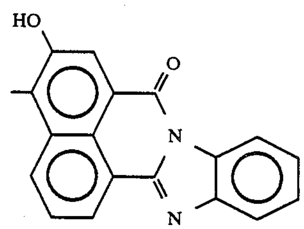
(115)
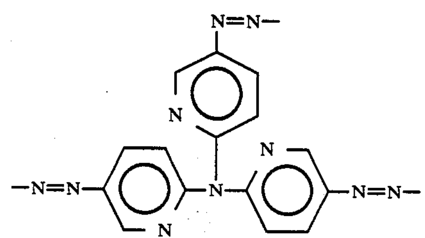
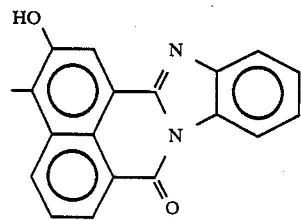
(116)

-continued
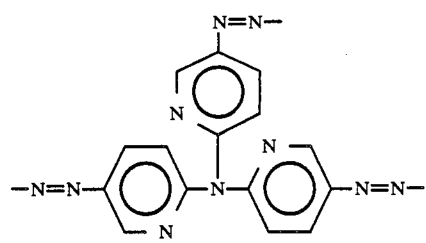
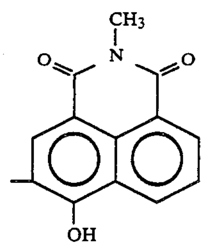
(117)
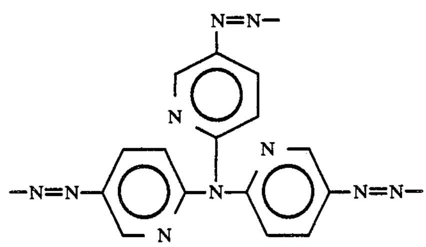
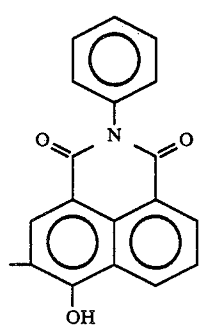
(118)
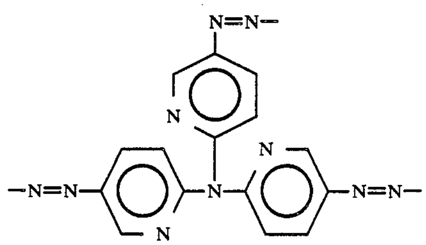
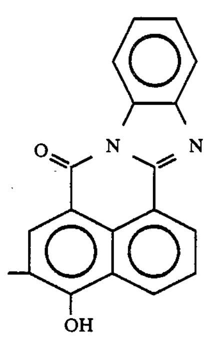
(119)
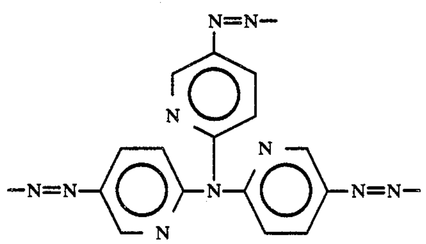
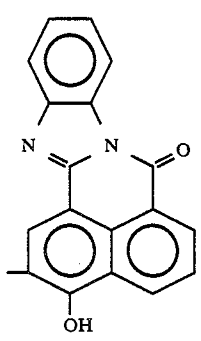
(120)

-continued
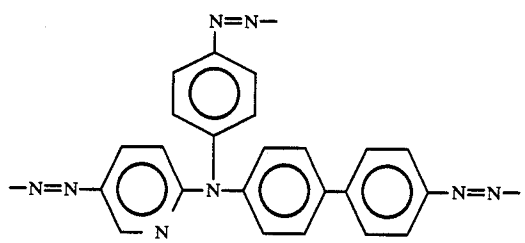
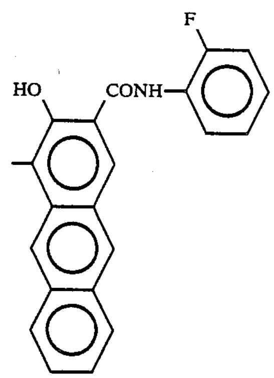
(121)
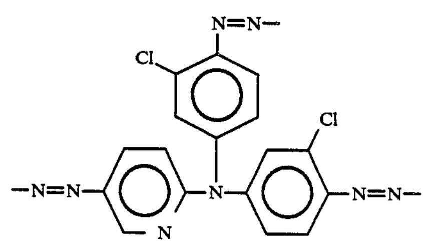
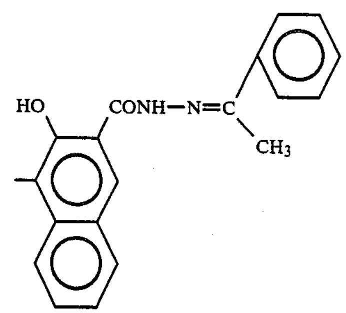
(122)
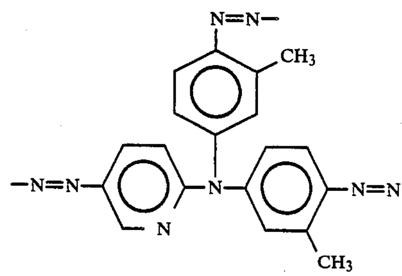
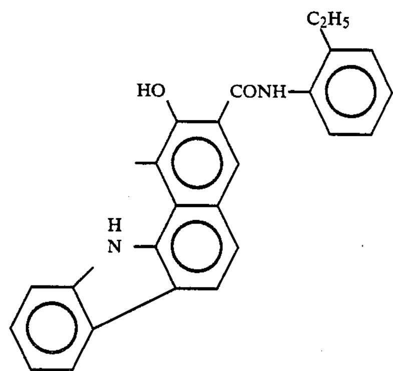
(123)
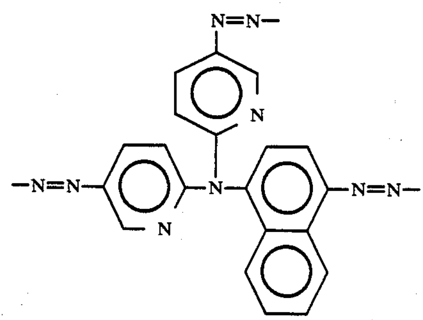
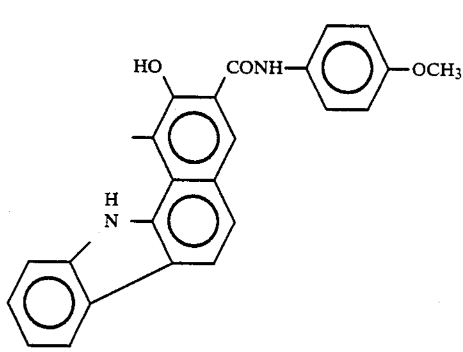
(124)

-continued

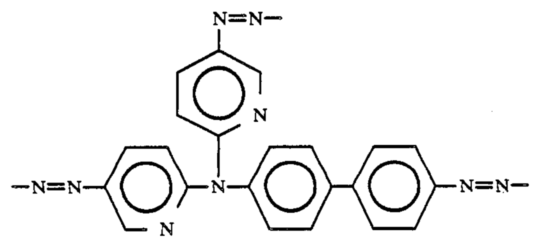
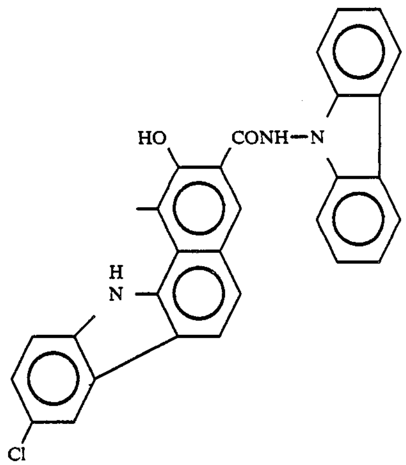

(125)

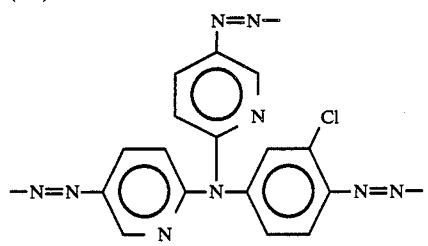
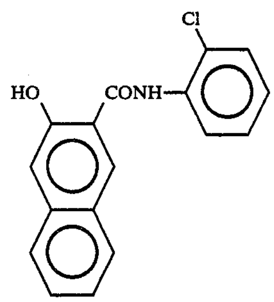

(126)

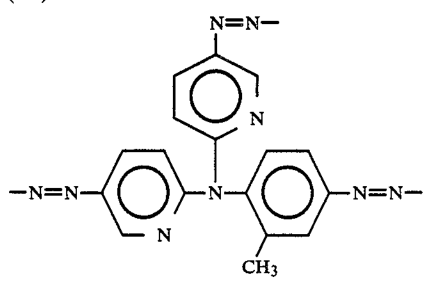
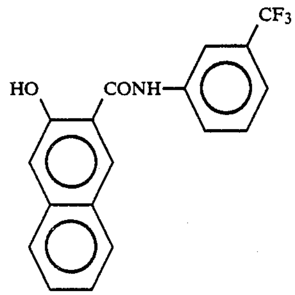

The above-mentioned examples of the azo pigments may be used singly or in combination of two or more species.

The azo pigment according to the present invention may be readily produced by (a) treating an amine represented by the formula (14) below:

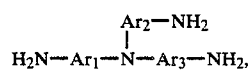

(14)

wherein $Ar_1$, $Ar_2$ and $Ar_3$ have the same meanings as defined for the formula (1), with a nitrite salt in a conventional manner to form a hexazonium salt, which is then coupled with a coupler represented by the following formulas (15)-(21) in an aqueous medium in the presence of an alkali:

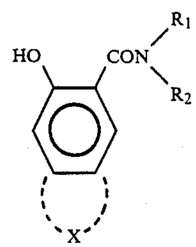

(15)

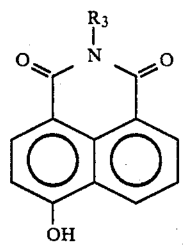

(16)

-continued (17)

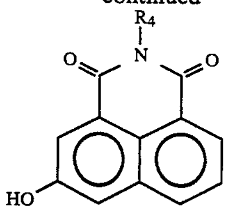

(18)

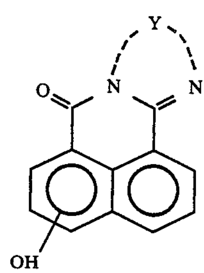

(19)

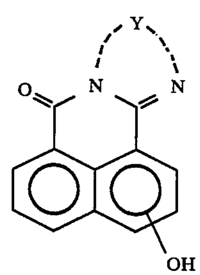

(20)

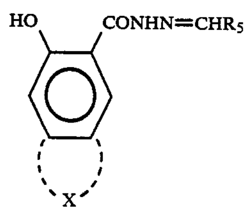

(21)

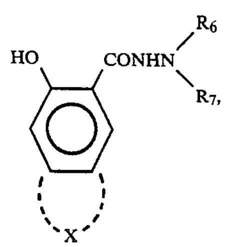

wherein $R_1$, $R_2$, $R_3$, $R_4$, $R_5$, $R_6$ and $R_7$ have the same meanings as defined above; or (b) once isolating the hexagonium salt of the above-mentioned amine in the form of a borofluoride salt or a zinc chloride complex salt thereof, which is then coupled with a coupler is described above in the presence of an alkali in an appropriate solvent, such as N,N-dimethylformamide and dimethyl sulfoxide.

Some representative examples of synthesis of azo pigments used in the present invention will be shown hereinbelow.

Synthesis Example 1

(Synthesis of Azo pigment example (1) shown above with its central skeleton and coupler structure)

In a 500 ml-beaker, 80 ml of water and 16.6 ml (0.19 mol) of conc. hydrochloric acid were charged, and 8.04 g (0.029 mol) of 4,4'-diaminodiphenyl-4''-aminopyridyl-2''-amine was added while being cooled on an ice-water bath. The mixture was brought to a liquid temperature of 3° C. under stirring. Then, a solution of 6.3 g (0.0915 mol) of sodium nitrite in 10 ml of water was added dropsie in 10 minutes while controlling the liquid temperature at below 5° C., and after the addition, the mixture was stirred at the same temperature for further 30 minutes. Carbon was added to the reaction liquid, followed by filtration to obtain a liquid containing a hexazonium salt.

Then, in a 2 l-beaker, 700 ml of dimethylformamide and 79.5 g (0.80 mol) of triethylamine were added, and 34.8 g (0.0915 mol) of 2-hydroxy-3-benzazylic acid-2'-ethylanilide was added to be dissolved therein. The coupler solution thus obtained was cooled to 5° C., and the above-obtained hexazotized liquid was added thereto dropwise in 30 minutes under stirring while controlling the liquid to temperature to 5°-10° C. Thereafter, the mixture was stirred for 2 hours at room temperature and left standing overnight. The reaction liquid was filtered to recover a solid, which was then washed with water to obtain an aqueous paste containing 37.4 g of crude pigment as solid.

Then, the crude pigment was subjected to 4 times of stirring with 400 ml of N,N'-dimethylformamide followed by filtration at room temperature, and then subjected to 2 times of stirring with 400 ml of methyl ethyl ketone followed by filtration. Thereafter, drying was effected under vacuum at room temperature to recover 36.1 g of purified pigment. The yield was 85%. The product showed a melting point of over 250° C. and gave the following results of elementary analysis:

| | Calculated (%) | Measured (%) |
|---|---|---|
| C | 75.39 | 75.09 |
| H | 4.68 | 4.49 |
| N | 13.38 | 13.22 |

While an example of analysis of a representative pigment has been described hereinabove, the other azo pigments represented by the general formula (1) may be synthesized in a similar manner.

A film containing the azo pigment shows photoconductivity and therefore can be used as a photosensitive layer of a photosensitive member for electrophotography as will be described hereinbelow.

More specifically, in one embodiment of the present invention, a photosensitive member may be prepared by forming a film comprising the above-mentioned pigment in an appropriate binder on an electroconductive support.

In a preferred embodiment of the present invention, the photosensitive layer of the photosensitive member may be functionally separated into a charge generation layer and a charge transportation layer, and the above-mentioned photoconductive film may be used as the charge generation layer.

The charge generation layer should preferably contain the above-mentioned azo pigment showing a photoconductivity as much as possible in order to obtain a sufficient absorbance, and be formed as a thin layer of, e.g., 5 μm or less, preferably 0.01 to 1 μm, in thickness so that generated charge carriers are effectively transported to the interface with the charge transportation layer or the interface with the electroconductive support. This originates from necessary conditions that the most part of incident light is absorbed by the charge generation layer to generate many charge carriers, and that the generated charge carriers are effectively injected into the charge transportation layer without being deactivated through recombination or trapping in the charge generation layer.

The charge generation layer may be produced by dispersing the azo pigment in an appropriate binder and coating the dispersion onto a support. The binder for forming the charge generation layer by coating may be selected from a wide variety of insulating resins or alternatively from organic photoconductive polymers such as poly-N-vinylcarbazole, polyvinylanthracene, and polyvinylpyrene. Preferred examples of the insulating resin include polyvinyl butyral, polyvinylbenzol, polyarylates (e.g., polycondensation product between bisphenol A and phthalic acid), polycarbonate, polyester, phenoxy resin, polyvinyl acetate, acrylic resin, polyacrylamide resin, polyamide, polyvinylpyridine, cellulose resin, urethane resin, epoxy resin, casein, polyvinyl alcohol, and polyvinylpyrrolidone. The resin content in the charge generation layer should preferably be 80 wt.% or less, more preferably 40 wt.% or less.

The charge transportation layer is electrically connected with the above mentioned charge generation layer and has functions of receiving charge carriers injected from the charge generation layer in the presence of an electric field and transporting the charge carriers to the surface. The charge transportation layer can be disposed in laminated form either below or above the charge generation layer.

The charge transporting substance in the charge transportation layer includes an electron transporting substance and a hole transporting substance. Examples of the electron transporting substance include an electron attractive substance such as chloroanil, tetracyanoethylene, tetracyanoquinodimethane, 2,4,5,7-tetranitro-9-fluorenone, 2,4,5,7-tetranitroxanthone, and 2,4,8-trinitrothioxanthone, and a substance obtained by converting such an electron attractive substance into a polymer form.

Examples of the hole transporting substance include pyrene; carbazoles such as N-ethylcarbazole, and N-methyl-N-phenylhydrazino-3-methylidene-9-ethylcarbazole; N,N-diphenylhydrazino-3-methylidene-10-ethylphenothiazine; hydrazones such as p-diethylaminobenzaldehyde-N,N-diphenylhydrazone, p-pyrrolidinobenzaldehyde-N,N-diphenylhydrazone, and p-diethylbenzaldehyde-3-methylbenzothiazolinone-2-hydrazone; 2,5-bis(p-diethylaminophenyl)-1,3,4-oxadiazole; pyrazolines such as 1-phenyl-3-(p-diethylaminostyryl)-5-(p-diethylaminophenyl)pyrazoline, 1-[pyridyl(2)]-3-(p-diethylaminostyryl)-5-(p-diethylaminophenyl)pyrazoline, 1-[pyridyl(3)]-3-(p-diethylaminostyryl)-5-(p-diethylaminophenyl)pyrazoline, 1-[pyridyl(2)]-3-(p-diethylaminostyryl)-4-methyl-5-(p-diethylaminophenyl)pyrazoline, 1-phenyl-3-(p-diethylaminostyryl)-4-methyl-5-(p-diethylaminophenyl)-pyrazoline, and spiropyrazoline; oxazoles such as 2-(p-diethylaminostyryl)-6-diethylaminobenzoxazole, and 2-(p-diethylaminophenyl)-4-(p-dimethylaminophenyl)-5-(2-chlorophenyl)oxazole; thiazoles such as 2-(p-diethylaminostyryl)-6-diethylaminobenzothiazole; triarylmethanes such as bis(4-diethylamino-2-methylphenyl)-phenylmethane; polyarylalkanes such as 1,1-bis(4-N,N-diethylamino-2-methylphenyl)heptane, and 1,1,2,2-tetrakis(4-N,N-dimethylamino-2-methyl)ethane; triphenylamine, stilbene derivatives, poly-N-vinylcarbazole, polyvinylpyrene, polyvinylanthracene, polyvinylacrydine, poly-9-vinylphenylanthracene, pyrene-formaldehyde resin, and ethylcarbazole-formaldehyde resin.

In addition to the above mentioned organic charge transporting substances, inorganic substances such as selenium, selenium-tellurium, amorphous silicon, and cadmium sulfide.

These charge transporting substances may be used singly or as a mixture of two or more species.

When, the charge transporting substance does not have a film-formability, it is formed into a film by using an appropriate binder. Examples of the binder to be used for this purpose include: insulating resins such as acrylic resin, polyarylate, polyester, polycarbonate, polystyrene, acrylonitrile-styrene copolymer, acrylonitrile-butadiene copolymer, polyvinylbutyral, polyvinyl formal, polysulfone, polyacrylamide, polyamide, and chlorinated rubber; and organic photoconductive polymers such as poly-N-vinylcarbazole, polyvinylanthracene, and polyvinylpyrene.

The charge transportation layer has an upper limit for transporting charge carriers and should not be formed in an unnecessarily large thickness. The thickness is generally from 5 to 30 μm, but is preferably within the range of 8 to 20 μm.

A photosensitive layer comprising a laminated structure of the charge generation layer and the charge transportation layer may be formed on an electroconductive support. The electroconductive support may be a support which per se has an electroconductivity such as that of aluminum, aluminum alloy, copper, zinc, stainless steel, vanadium, molybdenum, chromium, titanium, nickel, indium, gold, and platinum; alternatively, a support of a plastic (such as polyethylene, polypropylene, polyvinyl chloride, polyethylene terephthalate, acrylic resin, or polyethylene fluoride) coated with, e.g., a vapor-deposited layer of aluminum, aluminum alloy, indium oxide, tin oxide, or indium oxide-tin oxide; a plastic support or an electroconductive support as mentioned above each coated with a mixture of an electroconductive powder such as powder of aluminum, titanium oxide or zinc oxide, carbon black or silver powder and an appropriate binder; a plastic or paper support impregnated with an electroconductive powder; or a support comprising an electroconductive polymer.

Between the electroconductive support and the photosensitive layer, there may be formed an undercoat layer having a barrier function and an adhesive function. The undercoat layer may formed of, e.g., casein, polyvinyl alcohol, nitrocellulose, ethyleneacrylic acid copolymer, polyamide (nylon 6, nylon 66, nylon 610, copolymer nylon, alkoxymethylated nylon) polyurethane, gelatine, or aluminum oxide.

The thickness of the undercoat layer should preferably be 0.1 to 5 μm, particularly 0.5 to 3 μm.

In another embodiment according to the present invention, a photosensitive member for electrophotography may be formed by incorporating the above-mentioned azo pigment represented by the formula (1) in the same layer as the charge transporting substance. In this case, instead of or in addition to the charge transporting substance as described above, a charge-transfer complex comprising poly-N-vinylcarbazole and trinitrofluorenone may be used. A photosensitive member for electrophotography according to this embodiment may be formed by dispersing the azo pigment and the charge-transfer complex in a solution of polyester in tetrahydrofuran and applying the resultant coating liquid to form a film.

In any of the photosensitive members, the pigment to be used comprises at least one azo pigment selected from those represented by the formula (1). The azo pigment may be either amorphous or crystalline.

Two or more of the azo pigments may be used in combination, as desired, for the purpose of increasing the sensitivity of the photosensitive member through combination of pigments having different light absorption characteristics or obtaining a panchromatic photosensitive member. Alternatively, it is also possible to use the azo pigment represented by the formula (1) in combination with another charge generating substance selected from known dyes and pigments.

The photosensitive member for electrophotography according to the present invention may be used not only for ordinary electrophotographic copying machines but also in the fields related to electrophotography such as digital electrophotographic copying machines, laser printers, CRT printers, LED printers, liquid crystal printers, and laser plate-making, which may be inclusively referred to as a digital recording system in which a near infrared light source is suitably used.

The present invention will be explained more specifically with reference to examples.

EXAMPLES 1-40

An ammoniacal aqueous solution of casein (casein: 11.2%, 28% aqueous solution of ammonia: 1 g, and water: 222 ml) was applied onto an aluminum plate by means of wire bar so as to provide a 1.0 μ-thick dry film, and then dried.

Separately, 5 g of the above-shown Azo Pigment Example (1) was added to a solution of 2 g of a butyral resin (a butyral degree: 63 mol%) in 95 ml of ethanol and was dispersed for 2 hours by means of a sand mill. The thus obtained dispersion was applied onto the casein layer as obtained above by a wire bar so as to provide a 0.5 μ-thick dry film and then dried to form a charge generation layer.

Then, 5 g of a hydrazone compound having the formula:

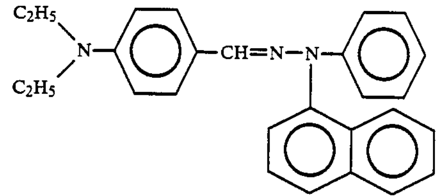

and 5 g of polymethylmethacrylate ($\overline{Mn}$ (number-average molecular weight): 100,000) were dissolved in 70 ml of benzene, and then mixture was applied onto the charge generation layer by a wire bar so as to provide a 20 μ-thick dry film and dried to form a charge transportation layer, whereby a photosensitive member was prepared.

Photosensitive members according to Examples 2 to 40 were prepared in the same manner as described above except that the Azo Pigment Example (1) was replaced by other Azo Pigment Examples shown in Table 1 (selected from those shown hereinabove).

The thus obtained photosensitive members were respectively corona-charged statically at −5 KV by means of an electrostatic copying paper tester Model SP-428 mfd. by Kawaguchi Denki K.K., stored for 1 second in a dark place, and then exposed to light at an illumination intensity of 2 lux, whereby the charging characteristics were measured. The charging characteristics were evaluated by measuring a surface potential ($V_0$) and an exposure quantity $E\frac{1}{2}$ (lux.sec) required for decreasing the potential after 1 second of storage in the dark to ½nd thereof.

COMPARATIVE EXAMPLES 1-5

Photosensitive members were prepared in the same manner as in Example 1 except that the Azo Pigment Example (1) was replaced by Comparative Pigment Examples 1-5, respectively, shown below with their structures of the central skeletons and coupler units.

The results of evaluation of Examples 1-40 and Comparative Examples 1-5 are inclusively shown in Table 1 appearing hereinafter.

| Comparative Pigment | Central skeleton | Coupler unit |
| --- | --- | --- |
| 1 | | |

-continued
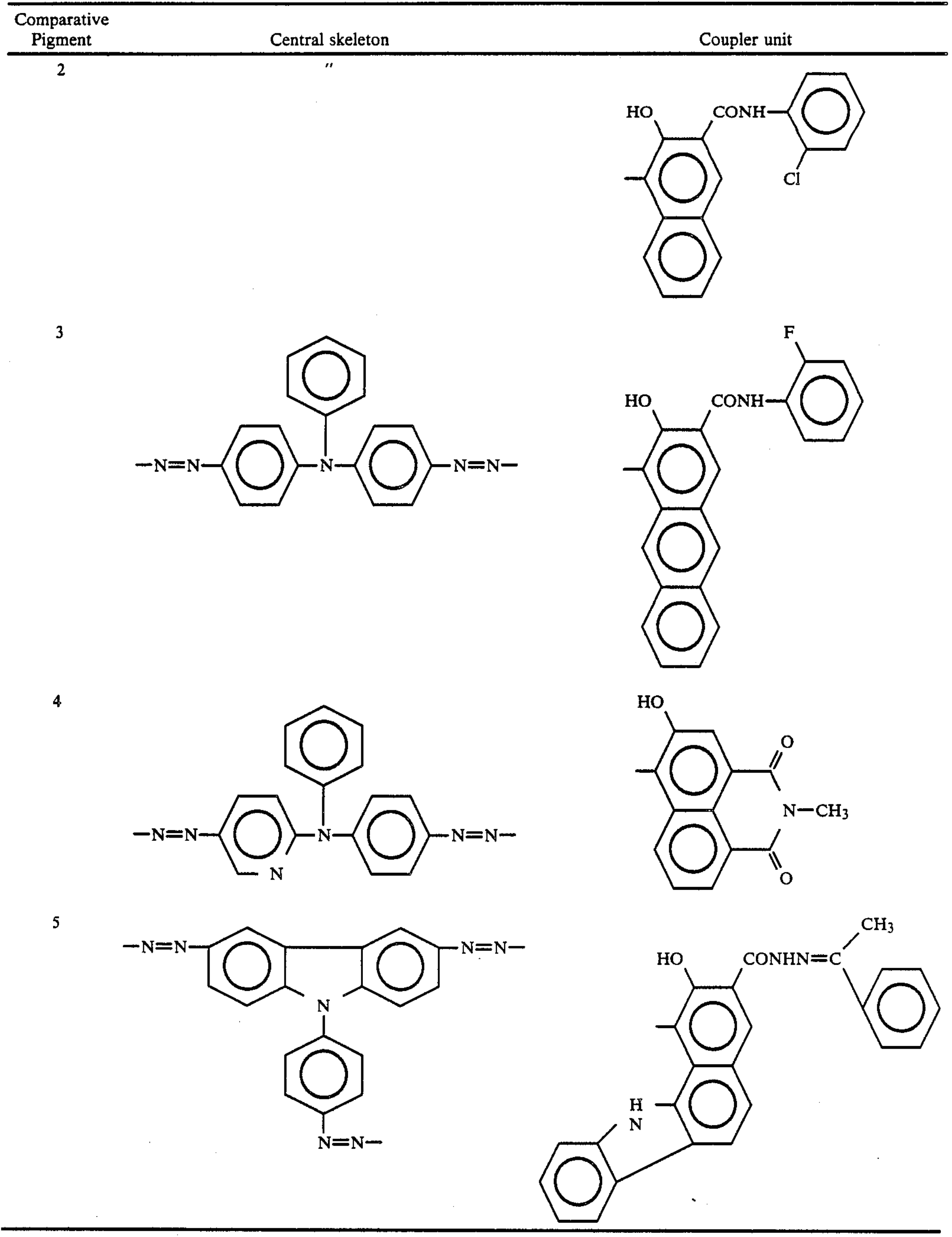
TABLE 1
| Example No. | Azo Pigment Example | $V_0$ (−V) | E ½ (l.s.) |
|---|---|---|---|
| 1 | (1) | 705 | 0.8 |
| 2 | (2) | 700 | 0.85 |
| 3 | (4) | 705 | 1.0 |
| 4 | (5) | 700 | 1.1 |
| 5 | (6) | 695 | 1.4 |
| 6 | (9) | 705 | 0.85 |
| 7 | (10) | 685 | 0.95 |
| 8 | (12) | 695 | 1.5 |
| 9 | (15) | 700 | 1.7 |
| 10 | (18) | 705 | 2.0 |
| 11 | (19) | 700 | 2.1 |
| 12 | (21) | 700 | 1.8 |
| 13 | (23) | 705 | 2.4 |
| 14 | (24) | 700 | 1.7 |
| 15 | (25) | 705 | 2.2 |
TABLE 1-continued
| | | | |
|---|---|---|---|
| 16 | (30) | 705 | 2.8 |
| 17 | (31) | 705 | 1.5 |
| 18 | (32) | 700 | 2.4 |
| 19 | (35) | 705 | 1.9 |
| 20 | (39) | 710 | 1.7 |
| 21 | (40) | 695 | 3.0 |
| 22 | (41) | 700 | 0.8 |
| 23 | (42) | 705 | 0.9 |
| 24 | (44) | 700 | 0.85 |
| 25 | (45) | 705 | 0.75 |
| 26 | (46) | 700 | 1.2 |
| 27 | (49) | 700 | 0.75 |
| 28 | (50) | 685 | 1.3 |
| 29 | (51) | 695 | 1.5 |
| 30 | (61) | 700 | 1.5 |
| 31 | (63) | 705 | 1.9 |

TABLE 1-continued

| | | | |
|---|---|---|---|
| 32 | (69) | 700 | 1.4 |
| 33 | (71) | 700 | 0.9 |
| 34 | (81) | 675 | 0.7 |
| 35 | (84) | 685 | 0.85 |
| 36 | (85) | 700 | 1.1 |
| 37 | (89) | 690 | 0.8 |
| 38 | (103) | 685 | 1.9 |
| 39 | (105) | 690 | 2.2 |
| 40 | (111) | 695 | 1.2 |
| Comparative Example No. | Comparative Pigment Example | $V_0$ (−V) | E ½ (l.s.) |
| 1 | 1 | 700 | 1.5 |
| 2 | 2 | 705 | 3.2 |
| 3 | 3 | 700 | 4.2 |
| 4 | 4 | 695 | 3.8 |
| 5 | 5 | 700 | 5.2 |

The results given in Table 1 show that the examples of the photosensitive member according to the present invention all have a sufficient chargeability and a sufficient sensitivity.

EXAMPLES 41–65

5 g of Azo Pigment Example (3) shown before was added to a solution of 2 g of a benzal resin (obtained by modifying polyvinyl alcohol having a polymerization degree of 500 with benzal (benzalladehyde) to a benzal degree of 70 mol%) in 95 of methyl isobutyl ketone, and the mixture was subjected to dispersion for 4 hours by means of a sand mill. The thus obtained dispersion was applied onto an aluminum plate by a wire bar so as to provide a 0.5 μm-thick dry film and then dried to form a charge generation layer.

Then, 5 g of a stilbene compound having the formula:

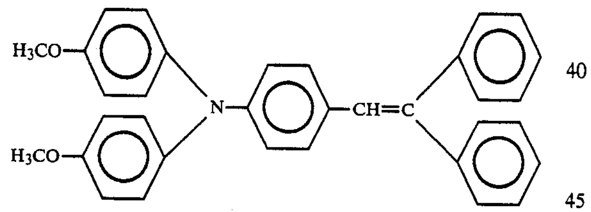

and 5 g of polymethylmethacrylate ($\overline{Mn}$: 100,000) were dissolved in 70 ml of benzene, and then mixture was applied onto the charge generation layer by a wire bar so as to provide a 18μ-thick dry film and dried to form a charge transportation layer, whereby a photosensitive member of Example 41 was prepared.

Photosensitive members according to Examples 42 to 65 were prepared in the same manner as described above except that the Azo Pigment Example (3) was replaced by other Azo Pigment Examples shown in Table 2 (selected from those shown hereinabove).

The thus obtained photosensitive members were respectively corona-charged statically at −5 KV by means of an electrostatic copying paper tester (Model SP-428 mfd. by Kawaguchi Denki K.K.) modified by replacing the scanning unit with a tungsten light source, stored for 1 second in a dark place, and then exposed to a 780 nm-semiconductor laser beam, whereby the charging characteristics were measured. The charging characteristics were evaluated by measuring a surface potential ($V_0$) and an exposure quantity E½ (lux.sec) required for decreasing the potential after 1 second of storage in the dark to ½nd thereof.

Further, the spectral absorption of each photosensitive member was measured by means of an instantaneous multi-measurement detector (MCPD-100, mfd. by Union Giken K.K.) to evacuate the sensitive wavelength region of the photosensitive member in terms of a wavelength $\lambda_d$ at which the spectral absorption waveform showed a falling shoulder and a flatness factor F $(=H(\lambda_{800})/H(\lambda_{760})\times 100)$, i.e., the ratio of the waveheight at 800 nm to that at 760 nm, in the spectral absorption waveform. Incidentally, the spectral absorption waveform measured by the MCPD-100 showed an extremely good coincidence with the sensitivity waveform obtained by using the Model SP-428 before the modification while using various filters.

The results of the potential characteristics and sensitive wavelength regions thus measured are shown in Table 2 below.

COMPARATIVE EXAMPLES 6–10

Photosensitive members were prepared in the same manner as in Example 41 except that the Azo Pigment Example (3) was replaced by Comparative Pigment Examples 1–5, respectively, and evaluated in the same manner. The results are also shown in the following Table 2.

TABLE 2

| Example No. | Azo Pigment Example | V (−V) | E 1/5 (μJ/cm²) | $\lambda_d$ (nm) | F (%) |
|---|---|---|---|---|---|
| 41 | (3) | 685 | 0.90 | 750 | 80 |
| 42 | (1) | 680 | 0.70 | 780 | 85 |
| 43 | (2) | 665 | 0.95 | 760 | 80 |
| 44 | (4) | 690 | 1.15 | 750 | 75 |
| 45 | (8) | 680 | 1.20 | 740 | 75 |
| 46 | (9) | 685 | 0.80 | 760 | 83 |
| 47 | (11) | 685 | 1.25 | 750 | 76 |
| 48 | (13) | 680 | 1.10 | 740 | 72 |
| 49 | (16) | 675 | 1.30 | 750 | 73 |
| 50 | (31) | 685 | 1.25 | 760 | 80 |
| 51 | (40) | 680 | 1.30 | 760 | 82 |
| 52 | (41) | 685 | 0.70 | 780 | 85 |
| 53 | (42) | 690 | 0.80 | 780 | 83 |
| 54 | (43) | 685 | 1.10 | 750 | 78 |
| 55 | (47) | 665 | 1.45 | 750 | 72 |
| 56 | (52) | 685 | 1.00 | 750 | 80 |
| 57 | (58) | 680 | 1.30 | 740 | 72 |
| 58 | (60) | 665 | 1.50 | 740 | 70 |
| 59 | (71) | 680 | 1.45 | 740 | 76 |
| 60 | (78) | 690 | 1.65 | 740 | 70 |
| 61 | (80) | 675 | 1.45 | 760 | 80 |
| 62 | (82) | 680 | 0.80 | 780 | 82 |
| 63 | (84) | 685 | 0.95 | 760 | 78 |
| 64 | (95) | 690 | 1.40 | 740 | 70 |
| 65 | (122) | 675 | 0.80 | 780 | 83 |
| Comparative Example No. | Comparative Pigment Example | V (−V) | E 1/5 (μJ/cm²) | $\lambda_d$ (nm) | F (%) |
| 6 | (1) | 680 | 1.25 | 780 | 80 |
| 7 | (2) | 685 | — | 660 | 0 |
| 8 | (3) | 680 | 8.5 | 660 | 15 |
| 9 | (4) | 675 | 12.0 | 650 | 5 |
| 10 | (5) | 680 | 5.8 | 720 | 25 |

The results in Table 2 show that the photosensitive member examples according to the present invention all have a sufficient sensitivity, a sufficient potential characteristic and a practically flat sensitive wavelength regionn in the range of 760–800 nm, while the photosensitive members of Comparative Examples except for Comparative Example 1 involve serious defects in respect of sensitivity in a long wavelength region.

EXAMPLES 66-73

The photosensitive members of Examples 12, 15, 18, 30, 42, 52, 62 and 65 were used for measurement of fluctuation in light area potential and dark area potential.

More specifically, each photosensitive member was applied onto a support cylinder of an electrophotographic copying machine provided with a −5.6 KV corona charger, an exposure optical system, a developer, a transfer charger, a charge-removing exposure optical system and a cleaner, and subjected to measurement. With respect to the photosensitive members of Examples 42, 52, 62 and 65, a 780 nm-semiconductor laser beam was used as an exposure optical system. The copying machine had a structure whereby an image was obtained on a transfer paper as the cylinder was driven. By using this copying machine, the light area potential ($V_L$) and dark area potential ($V_D$) in the first stage and after 5000 sheets of copying in a successive copying operation for the respective photosensitive members, while stirring the $V_L$ and $V_D$ in the initial stage to approximate levels of −100 V and −600 V, respectively. The results are shown in the following Table 3.

TABLE 3

| Example No. | Photosensitive member | Pigment Example | Initial stage $V_D$ (−V) | Initial stage $V_L$ (−V) | After 5000 sheets of copying $V_D$ (−V) | After 5000 sheets of copying $V_L$ (−V) |
|---|---|---|---|---|---|---|
| Example | Example | | | | | |
| 66 | 12 | (21) | 600 | 100 | 590 | 120 |
| 67 | 15 | (25) | 590 | 100 | 580 | 120 |
| 68 | 18 | (32) | 590 | 110 | 570 | 125 |
| 69 | 30 | (61) | 600 | 90 | 585 | 115 |
| 70 | 42 | (1) | 610 | 100 | 595 | 125 |
| 71 | 52 | (41) | 600 | 95 | 580 | 115 |
| 72 | 62 | (82) | 595 | 110 | 575 | 130 |
| 73 | 65 | (122) | 600 | 95 | 585 | 115 |

COMPARATIVE EXAMPLES 11 AND 12

Comparative Examples 11 and 12 were conducted by repeating the procedure of Example 66 with the use of photosensitive members from Comparative Examples 6 and 10 to evaluate the potential characteristics during a successive copying operation by using a 780 nm-semiconductor laser as an exposure optical system. As a result, the following potential changes were observed.

| Comparative Example | Initial stage $V_D$ (−V) | Initial stage $V_L$ (−V) | After 5000 sheets of copying $V_D$ (−V) | After 5000 sheets of copying $V_L$ (−V) |
|---|---|---|---|---|
| 11 | 590 | 100 | 480 | 200 |
| 12 | 600 | 180 | 500 | 290 |

It would be readily understood that the photosensitive members according to the present invention have better potential stability.

EXAMPLE 74

The charge generation layer prepared in Example 1 was coated with a coating liquid containing 5 g of 2,4,7-trinitro-9-fluorenone and 5 g of poly-4,4'-dioxydiphenyl-2,2'-propanecarbonate (molecular weight: 300,000) dissolved in 70 ml of tetrahydrofuran so as to provide a dry film of 10 g/m², and dried.

The thus prepared photosensitive member was subjected to measurement of charging characteristics in the same manner as in Example 1. The charging polarity at this time was positive. The following results were obtained.

| | |
|---|---|
| $V_0$ | ⊕ 680 volts |
| $E\frac{1}{2}$ | 2.4 lux.sec. |

EXAMPLE 75

An aluminum cylinder was coated with an ammoniacal solution of casein (casein: 11.2%, 28% aqueous solution of ammonia: 1 g, water: 222 ml) by dipping and dried to form an undercoat layer of 1.0 g/m².

Separately, 1 wt. part of Azo Pigment Example (123), 1 wt. part of a butyral resin (Eslec BM-2, mfd. by Sekisui Kagaku K.K.), and 30 wt. parts of isopropyl alcohol were dispersed for 4 hours by means of a ball mill disperser. The thus obtained dispersion was applied onto the undercoat layer obtained above and dried to form a charge generation layer of 0.3 μm in thickness.

Then, 1 wt. part of 4-diphenylamino-4'-methoxystilbene, 1 wt. part of polysulfone resin (P1700, mfd. by Union Carbide Corp.) and 6 wt. parts of monochlorobenzene were mixed and dissolved under stirring. The thus obtained liquid was applied on the charge generation layer by dipping and dried to form a charge transportation layer of 16 μm in thickness.

The thus prepared photosensitive member was subjected to corona discharge of −5 KV and the surface potential ($V_0$: initial potential) was measured. Further, the surface potential after standing of the photosensitive member for 5 seconds (dark attenuation potential $V_k$) was measured. The sensitivity was evaluated by measuring an exposure quantity $E\frac{1}{2}$ (μJ/cm²) required for decreasing the potential $V_k$ to ½ thereof. At this time, the light source was a three element-semiconductor laser of gallium/aluminum/arsenic (output: 5 mW, oscillation wavelength 780 nm). The following results were obtained.

$V_0$: −600 volts

Potential retainment ratio $((V_k/V_0)\times 100)$: 94% $E\frac{1}{2}$: 0.9 μJ/cm².

Then, the above photosensitive member was set in a laser beam printer (LBP-CX, mfd. by Canon K.K.) which was an electrophotographic printer of the reversal development system provided with the above mentioned semiconductor laser, and subjected to an actual image formation test under the following conditions:

Surface potential after primary charging: −700 V
Surface potential after imagewise exposure: −150 V (Exposure quantity: 1.0 μJ/cm²)
Transfer potential: +700 V
Developer agent polarity: Negative
Process speed: 50 mm/sec
Developing condition (developing bias): −450 V
Image exposure system: Image scanning system.
Exposure before primary charging: Whole-area exposure of red color of 50 lux.sec.

The image formation was effected by line-scanning the laser beam based on character signals and image signals, whereby good prints of both character and image were obtained.

EXAMPLE 76

An aluminum-vapor deposited polyethylene terephthalate film was provided, and the aluminum face thereof was coated with a polyvinyl alcohol film.

Then, the dispersion of the azo pigment used in Example 1 was applied on the polyvinyl alcohol film by means of a wire bar and dried to form a 0.5 μm-thick charge generation layer.

Then, 5 g of pyrazoline compound having the formula:

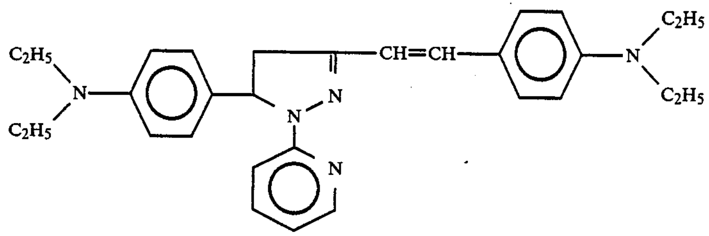

and 5 g of polyarylate resin (polycondensation product of bisphenol A and terephthalic acid-isophthalic acid) were dissolved in 70 ml of tetrahydrofuran, and the liquid was applied on the charge generation layer and dried to form a charge transportation layer of 15 μm in thickness.

The charging characteristic and successive copying characteristic of the thus prepared photosensitive member were measured similarly as in Example 1 and Example 41, whereby the following results were obtained.

$V_0$: −690 volts $E\frac{1}{2}$: 1.3 lux.sec

Successive operation characteristic

| Initial | | After 5000 sheets | |
|---|---|---|---|
| $V_D$ | $V_L$ | $V_D$ | $V_L$ |
| −600 V | −100 V | −585 V | −125 V |

The above results indicate that the photosensitive member had a good sensitivity as well as good potential stability during a successive operation.

EXAMPLE 77

A 100 μm-thick aluminum plate was coated with an ammoniacal solution of casein and dried to form a 0.5 μm-thick undercoat layer.

Then, 5 g of 2,4,7-trinitro-9-fluorenone and 5 g of poly-N-vinylcarbazole ($\overline{Mn}$=300,000) were dissolved in 70 ml of tetrahydrofuran to form a charge transfer complex. The charge transfer complex and 1 g of Azo Pigment Example (50) shown above were added to a solution of 5 g of a polyester resin (Bylon, mfd. by Toyobo K.K.) and subjected to dispersion. The dispersion was applied on the undercoat layer and dried to form a 12 μm-thick layer.

The charging characteristics of the photosensitive member were measured in the same manner as in Example 1 by using a positive charge polarity, whereby the following results were obtained:

$V_0$: ⊕600 volts $E\frac{1}{2}$: 3.0 lux.sec.

EXAMPLE 78

The casein layer of the casein-coated aluminum support prepared in Example 1 was successively coated with the charge transportation layer and the charge generation layer, whereby a photosensitive member which had the same structure as that of Example 1 except for the order of the layers was prepared. The charging characteristics of the photosensitive member were measured in the same manner as in Example 1 provided that the charging polarity was made positive, whereby the following results were obtained.

$V_0$: ⊕630 volts $E\frac{1}{2}$: 1.7 lux.sec.

Further, the same evaluation of the successive operation stability as in Example 41 was conducted except that the charging polarity was made positive, whereby the following results were obtained.

| Initial | | After 5000 sheets | |
|---|---|---|---|
| $V_D$ | $V_L$ | $V_D$ | $V_L$ |
| +600 V | +100 V | +565 V | +135 V |

What is claimed is:

1. A photosensitive member for electrophotography, which comprises a photosensitive layer containing a trisazo pigment represented by the formula:

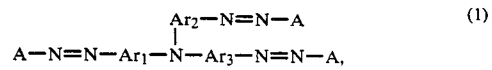

wherein $Ar_1$ is a pyridylene group capable of having a substituent; $Ar_2$ and $Ar_3$ are respectively a pyridylene group or an arylene group each capable of having a substituent; and A is a coupler residue having a phenolic OH group.

2. A photosensitive member according to claim 1, wherein said trisazo pigment is selected from those represented by the formulas (2), (3) and (4) shown below:

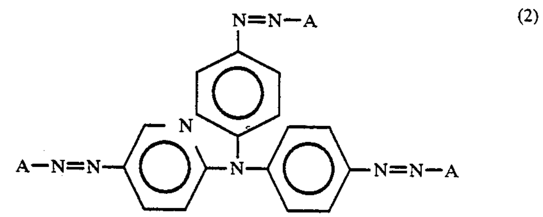

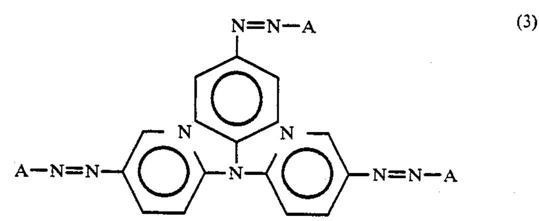

-continued

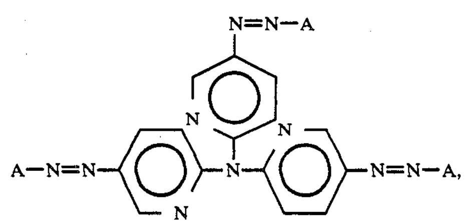

wherein the group A is the same as defined for the formula (1).

3. A photosensitive member according to claim 1, wherein the group A in the formula (1) is selected from those represented by the formulas (5)-(11) shown below:

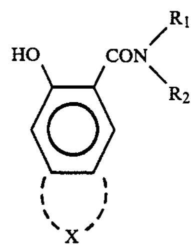

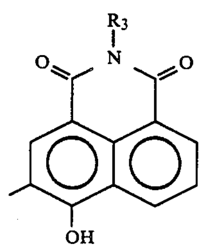

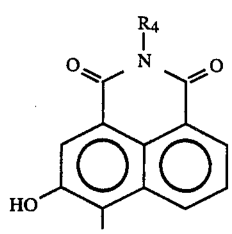

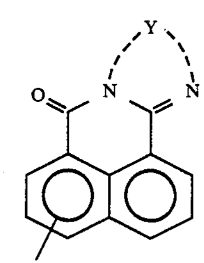

-continued

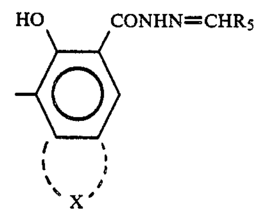

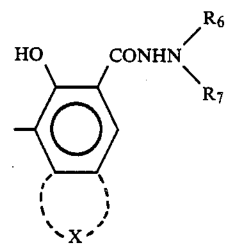

HO CONHN $R_6$ $R_7$ (11)

wherein X is a residue group condensed with the benzene ring to form a polycyclic aromatic ring or heterocyclic ring each capable of having a substituent; $R_1$ and $R_2$ are respectively hydrogen, alkyl, aralkyl, aryl or a heterocyclic group or residue groups forming in combination a cyclic amino group together with the nitrogen atom, each group being capable of having a substituent; $R_3$ and $R_4$ are respectively an alkyl, aralkyl or aryl each capable of having a substituent; Y is a divalent aromatic hydrocarbon group or a residue group forming a divalent heterocyclic group together with the nitrogen atoms, each capable of having a substituent; $R_5$ is an aryl or heterocyclic group each capable of having a substituent; and $R_6$ and $R_7$ are respectively an alkyl, aralkyl, aryl, heterocyclic, or residue group forming a cyclic amino group together with the nitrogen atom, each capable of having a substituent.

4. A photosensitive member according to claim 1 or 2, wherein the group A in the formula (1) is one represented by the formula (12) below:

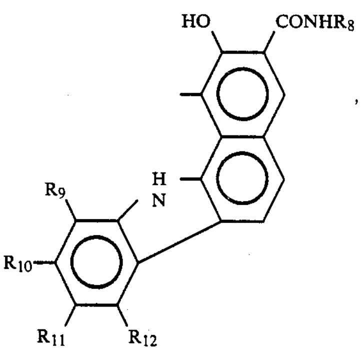

wherein $R_8$ is an alkyl, aryl, aralkyl or heterocyclic group, each capable of having a substituent, or a group of

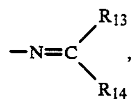

wherein $R_{13}$ and $R_{14}$ are respectively a hydrogen atom, an alkyl, aryl, aralkyl or heterocyclic group or residue groups forming in combination a 5- or 6-membered ring group together with the carbon atom bonded, each capable of having a substituent; $R_9$, $R_{10}$, $R_{11}$ and $R_{12}$ are respectively a hydrogen atom, a halogen atom, such as fluorine, bromine, chlorine or iodine, or a hydroxyl, nitro, trifluoromethyl, cyano, alkyl, alkoxy group, or an aryl, aralkyl or amino group capable of having a substituent; $R_9$ and $R_{10}$, $R_{10}$ and $R_{11}$, or $R_{11}$ and $R_{12}$ being capable of forming a condensed aromatic ring with the benzene ring as a part of these carbazole structure.

5. A photosensitive member according to claim 1 or 2, wherein the group A in the formula (1) is one represented by the formula (13) below:

(13)

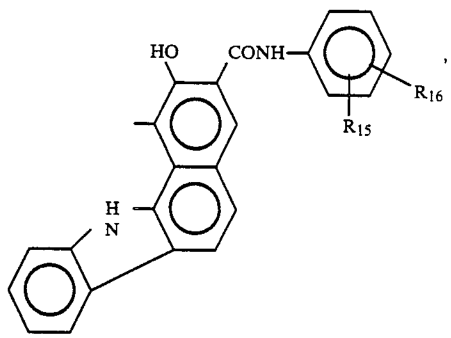

wherein $R_{15}$ and $R_{16}$ are respectively a hydrogen atom, a halogen atom, a nitro, cyano, trifluoromethyl, or an alkyl, aryl, alkoxyl or amino, each capable of having a substituent.

6. A photosensitive member according to claim 1 or 2, wherein the group A in the formula (1) is one represented by the formula (14) below:

(14)

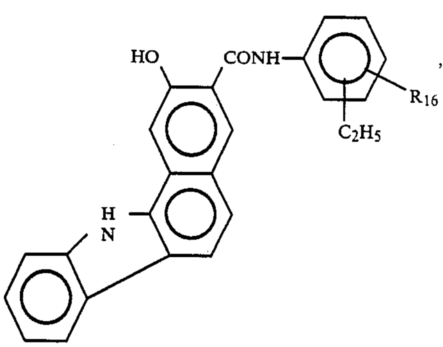

wherein the group $R_{16}$ is the same as defined for the formula (13).

* * * * *